United States Patent
Babuka et al.

[11] Patent Number: 5,867,236
[45] Date of Patent: Feb. 2, 1999

[54] CONSTRUCTION AND SEALING OF TILED, FLAT-PANEL DISPLAYS

[75] Inventors: Robert Babuka, Vestal; Raymond G. Greene, Ovid, both of N.Y.; John P. Koons, Warrenton, Va.; J. Peter Krusius; Che-Yu Li, both of Ithaca, N.Y.; Donald P. Seraphim, Vestal, N.Y.

[73] Assignee: Rainbow Displays, Inc.

[21] Appl. No.: 652,032

[22] Filed: May 21, 1996

[51] Int. Cl.⁶ .......................... G02F 1/133; G02F 1/1339
[52] U.S. Cl. .............................. 349/73; 349/153; 349/190
[58] Field of Search ............................ 349/73, 153, 190

[56] References Cited

U.S. PATENT DOCUMENTS

| | | | |
|---|---|---|---|
| 3,932,024 | 1/1976 | Yaguchi et al. | 350/160 LC |
| 3,967,882 | 7/1976 | Kubota et al. | 350/160 LC |
| 4,158,485 | 6/1979 | Mueller et al. | 350/343 |
| 4,466,701 | 8/1984 | Ogata et al. | 350/336 |
| 5,106,197 | 4/1992 | Ohuchida et al. | 349/73 |
| 5,610,742 | 3/1997 | Hinata et al. | 349/122 |
| 5,654,781 | 8/1997 | Izumi | 349/73 |
| 5,661,531 | 8/1997 | Greene et al. | 349/73 |

*Primary Examiner*—William L. Sikes
*Assistant Examiner*—Tiep H. Nguyen
*Attorney, Agent, or Firm*—Salzman & Levy

[57] ABSTRACT

The present invention features methods and apparatuses for sealing tiled, flat-panel displays (FPDs). Tile edges corresponding with the display's perimeter edges are designed with a wide seal. Interior edges, however, have narrow seals in order to maintain the desired, constant, pixel pitch across tile boundaries. In some cases, this invention applies specifically to arrays of tiles 2×2 or less, and, in other cases, to N×M arrays, where N and M are any integer numbers. The tiles are enclosed with top and bottom glass plates, which are sealed with an adhesive bond to the tiles on the outside perimeter of the tiled display. Vertical seams (where tiles meet at the perimeter of the FPD) are sealed with a small amount of polymer. The seal may be constructed between a cover plate and a back plate, sandwiching the tiles. The AMLCD edges may be coated with either a non-permeable material or a polymer having an extremely low permeability (for example, Parylene™). Alternatively, the edge sealing of individual tiles can be achieved by using a metallized film adhesive that is bonded to the tile edges. A low-temperature, sintered Solgel can be used to achieve extremely narrow, yet mechanically strong, seals for individual tiles. Still another enhancement employs a metallurgical seal outside a narrow, polymer seal.

22 Claims, 24 Drawing Sheets

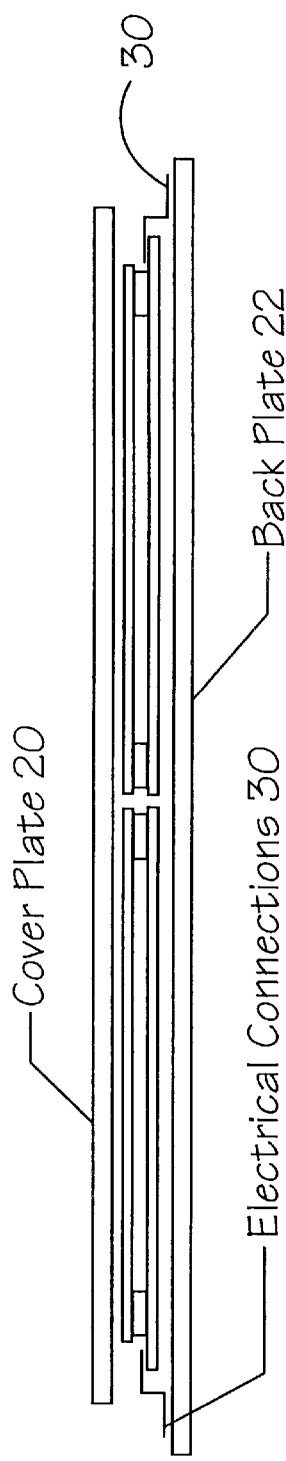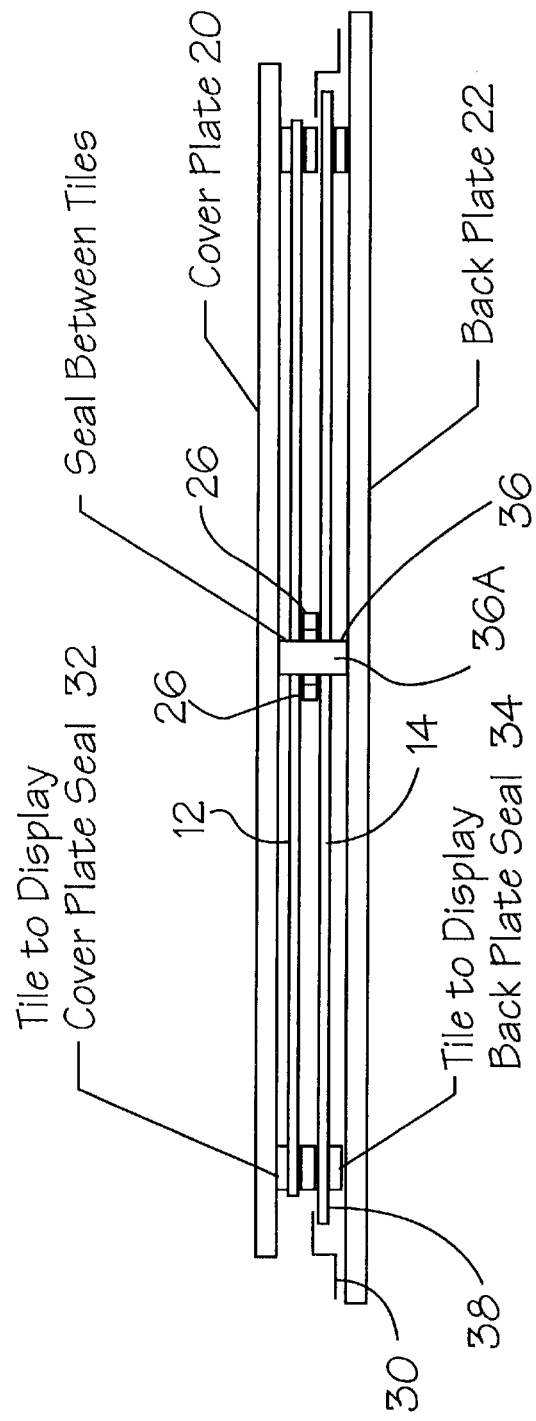

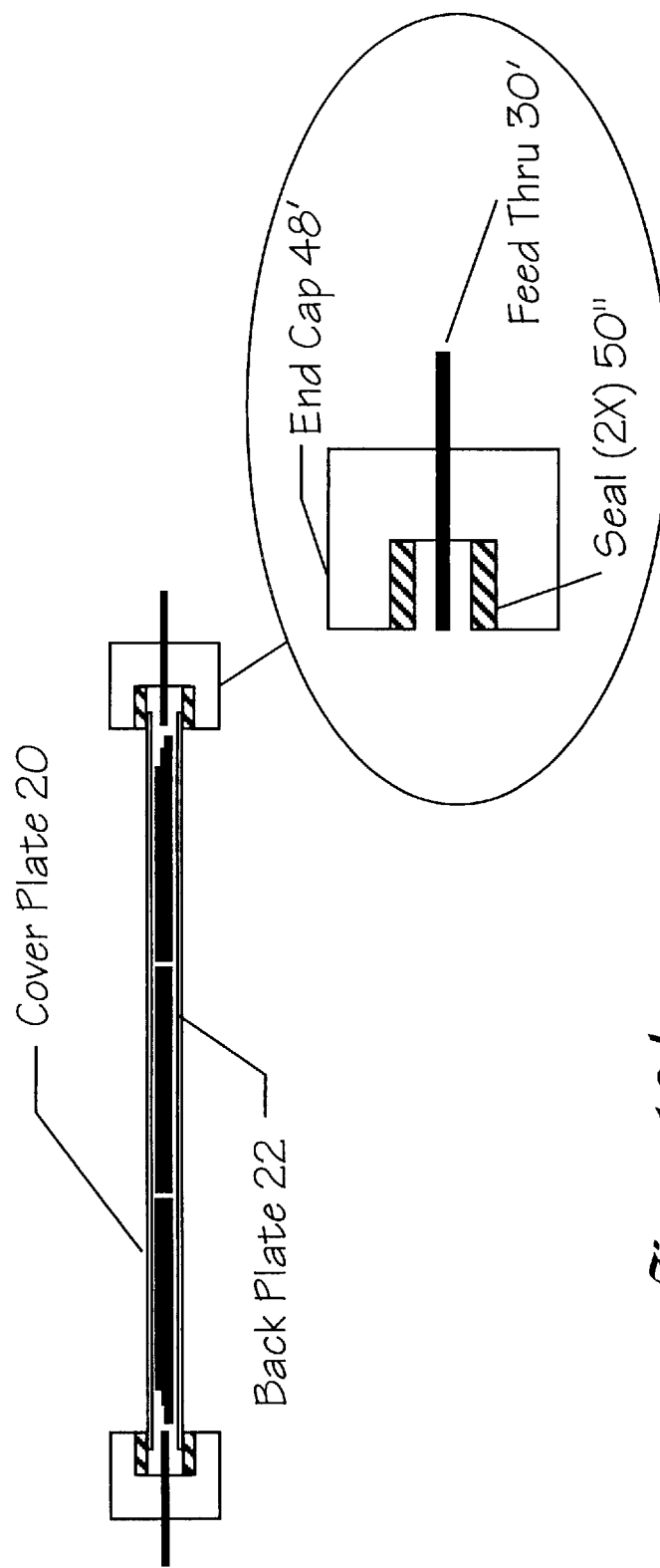

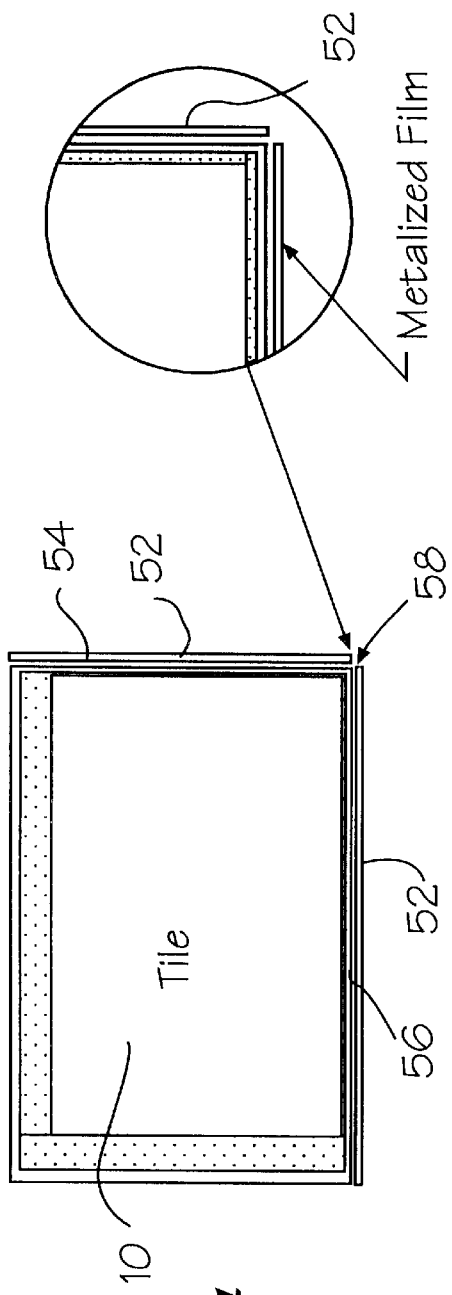
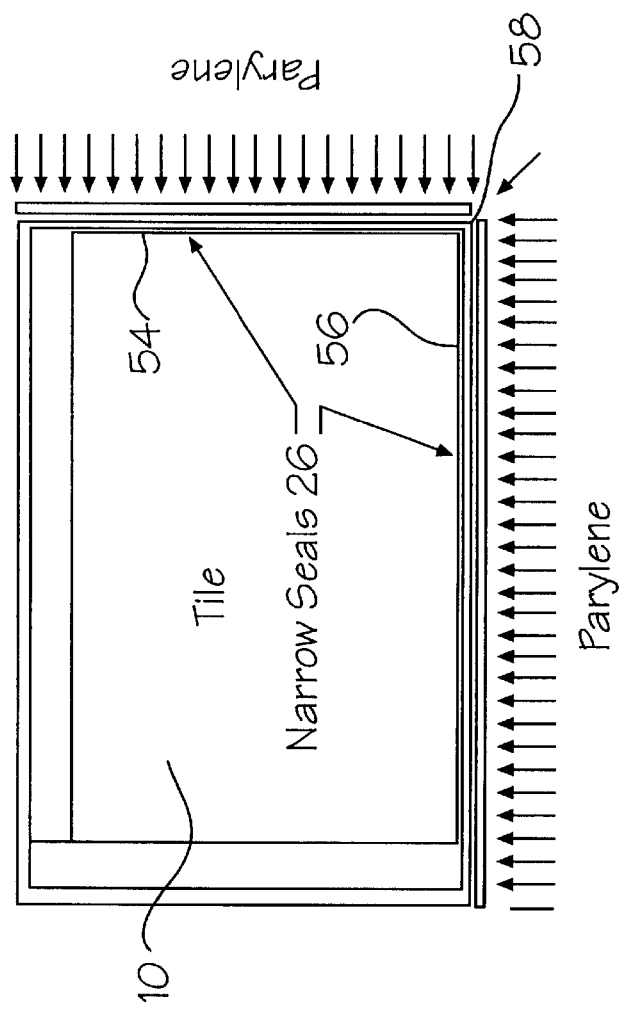

pixel layout of tile
illustrative and not to scale c = Ccom
t = row (gate) control line
r,g,b = column (drain) data signal for red, green, and blue

CONSTRUCTION AND SEALING OF TILED, FLAT-PANEL DISPLAYS

FIELD OF THE INVENTION

The invention pertains to the field of flat-panel displays (FPDs) and, more particularly, to the construction and sealing of large, monolithically-addressed, flat-panel displays having a plurality of display "tiles".

BACKGROUND OF THE INVENTION

Monolithic displays are used predominantly in laptop and portable computers of diagonal sizes of up to 12 inches. They have recently been introduced in desktop personal computers, as well as small televisions. In these applications, a frame surrounds the edge of the glass panels containing the active display elements, i.e., active-matrix liquid-crystal displays (AMLCDs).

Seals for liquid-crystal displays are located at the perimeter thereof and are covered by the frame and housing. Such seals provide a mechanical joint between the top and bottom glass plates of the FPD, as well as contain the liquid-crystal material between the plates. Although the seals are usually polymeric adhesives, a small quantity of glass (or alternative material) spacers contained therein maintains a desired separation distance between the top and bottom plates. Characteristically, this distance between plates ranges from a few microns to 15 microns or more. Typical widths of the seals themselves are customarily a few millimeters.

The polymeric adhesives are usually epoxy-based, thus having a solubility for water and a diffusivity that is appreciable enough to permit water permeation over extended periods of time (days to months). The desired size of seals for individual AMLCD tiles may be an order of magnitude narrower than 1 millimeter; however, the seals for AMLCD FPDs have been proven to be reliable only for widths of 1 millimeter or wider. The rate of diffusion increases exponentially with the reciprocal of the width of the seal, as well as in proportion to the seal thickness and the diffusivity constant for the seal material.

The seals perform several functions, as aforementioned. They mechanically hold the top plate and the bottom plate of the AMLCD in register (both vertically and horizontally), while also providing robustness to the optical stack. In fact, along with the glass plates, the adhesive forms the walls of a reservoir to hold the liquid-crystal material, protecting it from the ambient humidity which may degrade or change its optical properties.

Because the glass plates are not uniformly flat, the adhesive seal, along with spacers, provides a sustaining force to maintain the glass plates essentially parallel to each other and uniformly spaced with respect to one another. This spacing is important for uniform electro-optical response, which is determined by a liquid crystal's electric field that is generated by two respective plates, an anode and a cathode, one on each glass plate.

In order to environmentally protect the liquid-crystals, AMLCDs that are made up of a plurality of individual tiles may need unique sealing designs. Seal width is a major contributor to seam width, since there are two seals in a seam width, i.e, one on each tile perimeter. The more narrow the seam, the more efficient the light transmission is for viewing, and the easier it is to mask and modify the optical properties of the seam. In fact, narrow seals and seams in tiled displays allow for conventionally smaller pixel pitch, hence resulting in displays of greater resolution.

However, using narrow, conventional, epoxy seals may degrade both their mechanical and permeation performances. Therefore, tiled displays may need special attention to mechanical design, for the reliability of the individual tiles must be ensured, so as to prevent any effects from humid environments and provide forces maintaining the registration of the top and bottom plates of the AMLCD.

At the intersection of the tiles, the edge dimensions thereof are preferably maintained so that the interpixel spacing remains uniformly periodic throughout the tiles and across the seams, and the pitch minimized from tile to tile, as well as within each tile. Nevertheless, sealing integrity and reliability must be maintained for all of the display's tile edges. The tile perimeter design elements incorporated into the dark, interpixel space include:

a) the two seals on neighboring tiles;

b) the contact pads for the electrical connections, if they are located outside the seal;

c) the electrical connection thickness between the walls of the two tiles;

d) spacing between the tiles to allow for extraction of a tile for reworking, if so desired, without touching its neighboring tile(s);

e) glass-cutting tolerances; and f) location tolerances.

All of the above-cited components and spaces are within a dark space between tiles, and will set the width of the intertile spacing and the pixel pitch.

The liquid-crystal material in tiled, flat-panel displays has the same susceptibility to moisture as do monolithic, liquid-crystal displays, but the design and manufacturing problems become more thorny. The need for invisible seams between any one tile and its adjacent tiles results in the need to keep all dimensions in this area, including the width of the adhesive seal, extremely small (approximately a few tenths of a millimeter, at most).

Electrical connection to the display is usually achieved by utilizing flexible connections, either from a printed circuit board containing drive and addressing electronics, or with an integrated-function chip carrier/flexible cable design. In either case, such electrical connection decreases the space available for sealing for a given pixel pitch.

U.S. Pat. No. 5,668,569, described the advantage of positioning row and column drivers at a common edge of a tile and to deliver row and column signals to the tile from the common edge. This may eliminate the need for electrical connections at narrow ledges of interior tiles in a FPD of tiles 2×N, where N>2. This in turn may improve optical performance of the display.

It is advantageous to provide a reliable, semi-hermetic or hermetic seal without sacrificing the other functional requirements of tiled, flat-panel displays.

It is also advantageous to furnish fabrication techniques that improve the symmetry of the location of impurities in the liquid-crystal material, particularly in filling the space between the top and lower plates of the display or tile.

It is further advantageous to provide a seal that facilitates the electrical interconnection of tiles.

It is further advantageous to provide fabrication techniques that allow testing of tiles to assure quality before committing tiles to further assembly.

SUMMARY OF THE INVENTION

In accordance with the present invention, there are provided methods and apparatuses for sealing tiled, flat-panel displays. Tile edges corresponding with the display's perimeter edges are designed with a wide seal. Interior edges, however, have narrow seals in order to maintain the desired, constant, pixel pitch across tile boundaries. In some cases, this invention applies specifically to arrays of tiles 2×2 or less, and, in other cases, to N×M arrays, where N and M are any integer numbers.

The tiles may be enclosed with top and bottom glass plates, which are sealed with an adhesive bond to the tiles on the outside perimeter of the tiled display. Vertical seams (where tiles meet at the perimeter of the FPD) are sealed with a small amount of polymer. Alternatively, the seal may be constructed between a cover plate and a back plate, sandwiching the tiles. In still another alternative, the AMLCD edges may be coated with either a non-permeable material or a polymer having an extremely low permeability (e.g., Parylene™). Another example is liquid-crystal polymer.

Alternatively, the edge sealing of individual tiles can be achieved by using a metallized film adhesive that is bonded to the tile edges. A low-temperature, sintered Solgel can be used to achieve extremely narrow, yet mechanically strong, seals for individual tiles. Still another enhancement employs a metallurgical seal outside a narrow, polymer seal.

This invention also addresses processes for filling tiles with liquid-crystal material, so as to improve the optical seamlessness at tile boundaries. Also disclosed herein are designs for providing driver line inputs to all tiles in a tiled display, enabling the testing and verification of tiles prior to any further assembly.

Furthermore, this invention addresses the construction of the optical and structural elements of a tiled, flat-panel display, as well as methods of maintaining the coplanarity of viewing surfaces.

In addition, this invention addresses methods of providing row- and column-driver inputs to each tile in a tiled display.

In addition, this invention addresses methods to allow testing of tiles to assure quality before assembling tiled arrays.

Furthermore, this invention addresses wiring methods for positioning row and column drivers at a common edge of a tile.

BRIEF DESCRIPTION OF THE DRAWINGS

A complete understanding of the present invention may be obtained by reference to the accompanying drawings, when considered in conjunction with the subsequent, detailed description, in which:

FIG. 7 shows a side view of the display of FIG. 6;

FIG. 8 shows a side view of a preferred method of sealing the display shown in FIGS. 5, 6 and 7;

FIG. 13a shows an alternative sealing method using end caps;

FIG. 14 shows an alternative sealing method for a tile from a 2×2 tile array;

FIG. 15 shows an alternative method of sealing for all designs;

DESCRIPTION OF THE PREFERRED EMBODIMENT

The invention is a sealing assembly design for tiled, flat-panel displays and methods for manufacturing such displays incorporating the sealing design. The glass plates of the display tiles are substantially hermetically sealed to reduce or eliminate the effects of ambient humidity and to maintain the substantially coplanar registration of the plates with respect to each other. The edge seals of adjacent, abutting tiles must be narrow enough to maintain close-tolerance spacings therebetween, so as to result in visually imperceptible seams.

Figure 1:
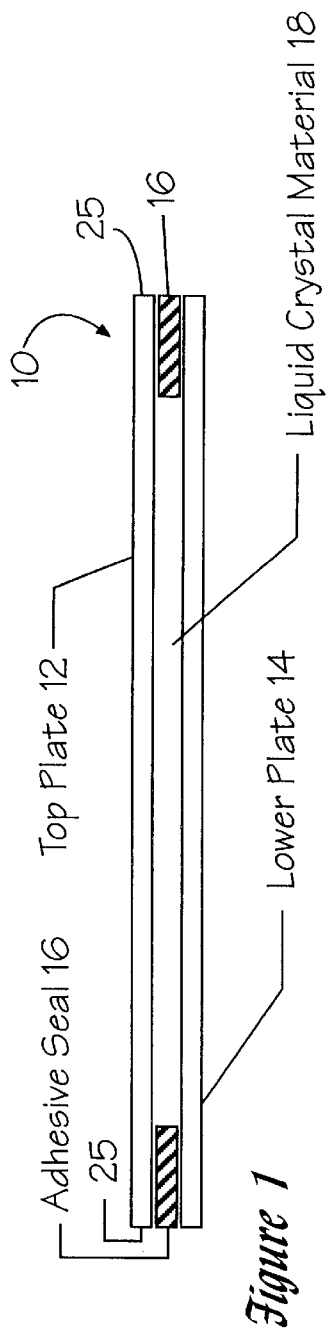
FIG. 1 shows the typical sealing method for monolithic LCD FPDs.

Referring now to FIG. 1, there is shown a typical tile 10 having a simple sealing arrangement. The top plate 12 and lower plate 14 are separated by an adhesive, peripheral seal 16. Active crystal material 18 is disposed in the space created by plates 12 and 14 and seal 16. For purposes of description herein, liquid-crystal technology is referred to in order to describe design and manufacturing elements, but the invention is not intended to be limited to AMLCDs. Several of the teachings may be applied to other flat-panel displays, such as plasma displays (PDs), Super Twisted Nematic (STN) LCDs, field-emission displays (FEDs), electroluminescent displays (ELDs) and digital-mirror displays (DMDs). Not all of the design elements are included herein (such as color filters, light shields, polarizers, electrodes, light valves and electrical connections).

Figure 2:
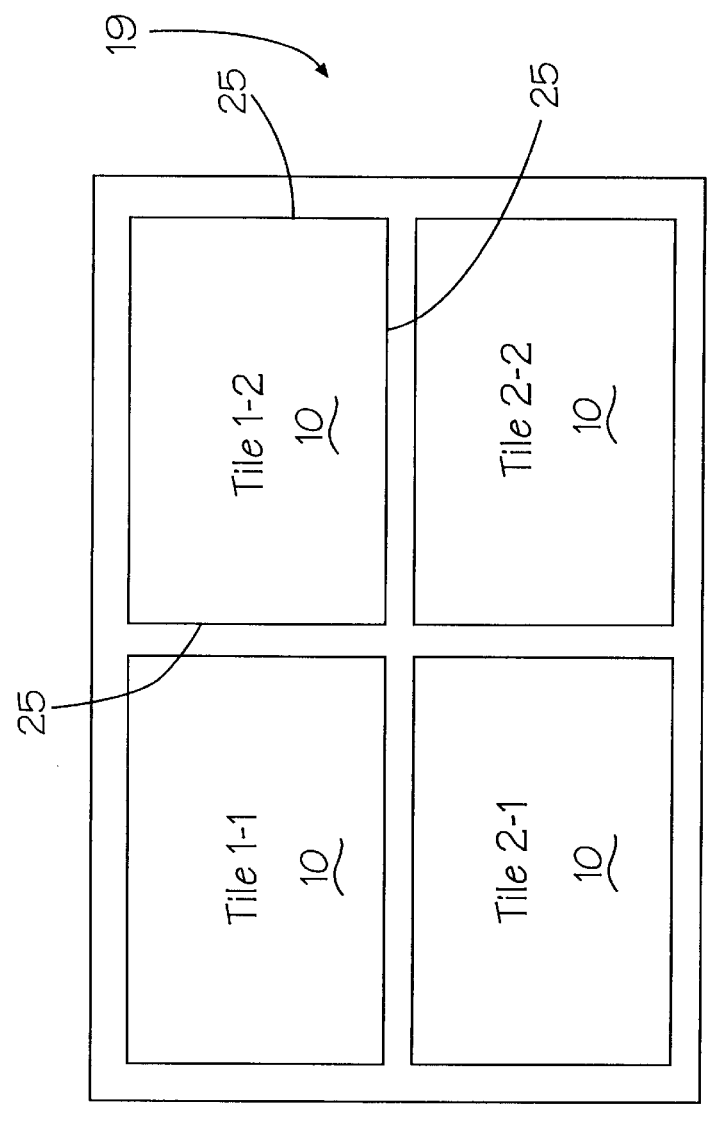
FIG. 2 shows a top view of a tiled display.
Figure 3:
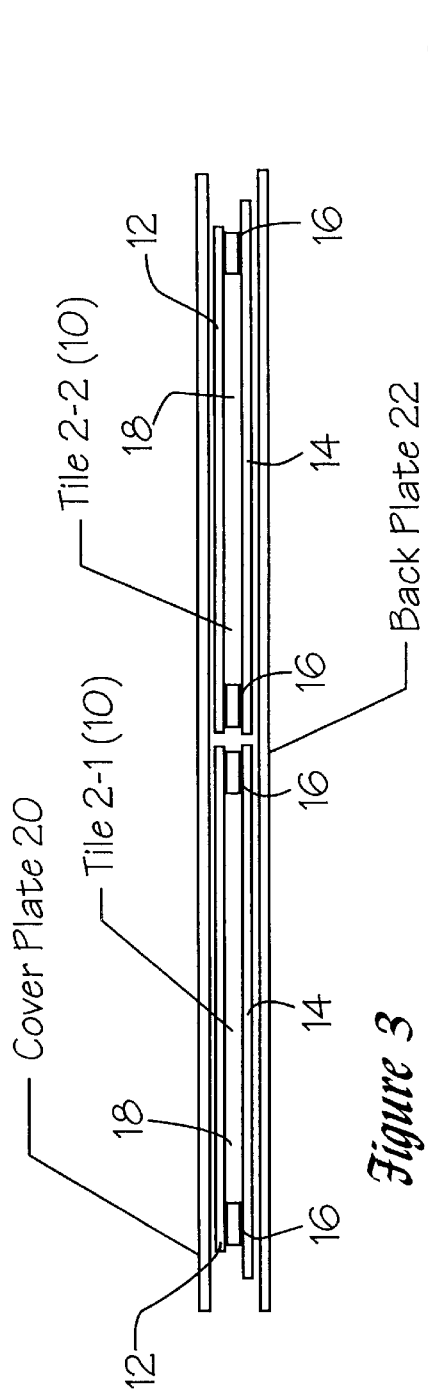
FIG. 3 shows a side view of a tiled display.

FIG. 2 shows a top view of a 2×2 tiled, flat-panel display 19; FIG. 3 shows the side view thereof. Each tile 1-1, 1-2, 2-1 and 2-2, shown in FIGS. 2 and 3, is similar in cross-section to the monolithic display or tile 10 shown in FIG. 1. In addition to the tile structures shown in FIG. 1, a cover plate 20 and a backplate 22 enclose the upper and lower surfaces, respectively, of a plurality of tiles 10. The construction, design, manufacture and function of tiled, flat-panel displays are described in detail in U.S. patent application Ser. Nos. 08/593,759 and 08/571,208, filed on Jan. 29, 1996, and Dec. 12, 1995, respectively, and are hereby incorporated by reference.

Figure 4:
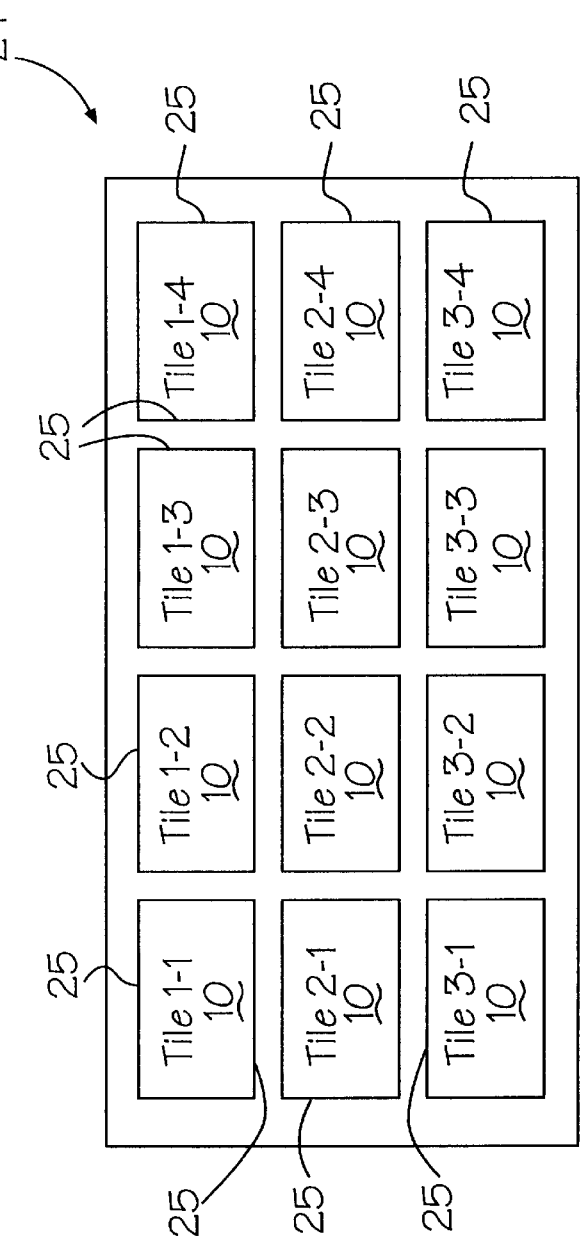
FIG. 4 shows a top view of a 3×4 tiled display.

The maximum number of tiles in an array of tiles is not limited, but arrays greater than 2×2 may require different sealing and assembly approaches than some of those suitable for a 2×2 array. This disclosure is not limited to arrays having the same number of tiles in a row as in a column. FIG. 4, for example, shows a 3×4 array 24 of tiles, for which the present invention applies.

Individual tiles 10 are sealed at their edges 25. In order to retain sealing effectiveness, another level of sealing described hereinbelow (in addition to a narrow seal) should be provided, if conventional, semi-hermetic, epoxy sealing materials are used.

Figure 5:
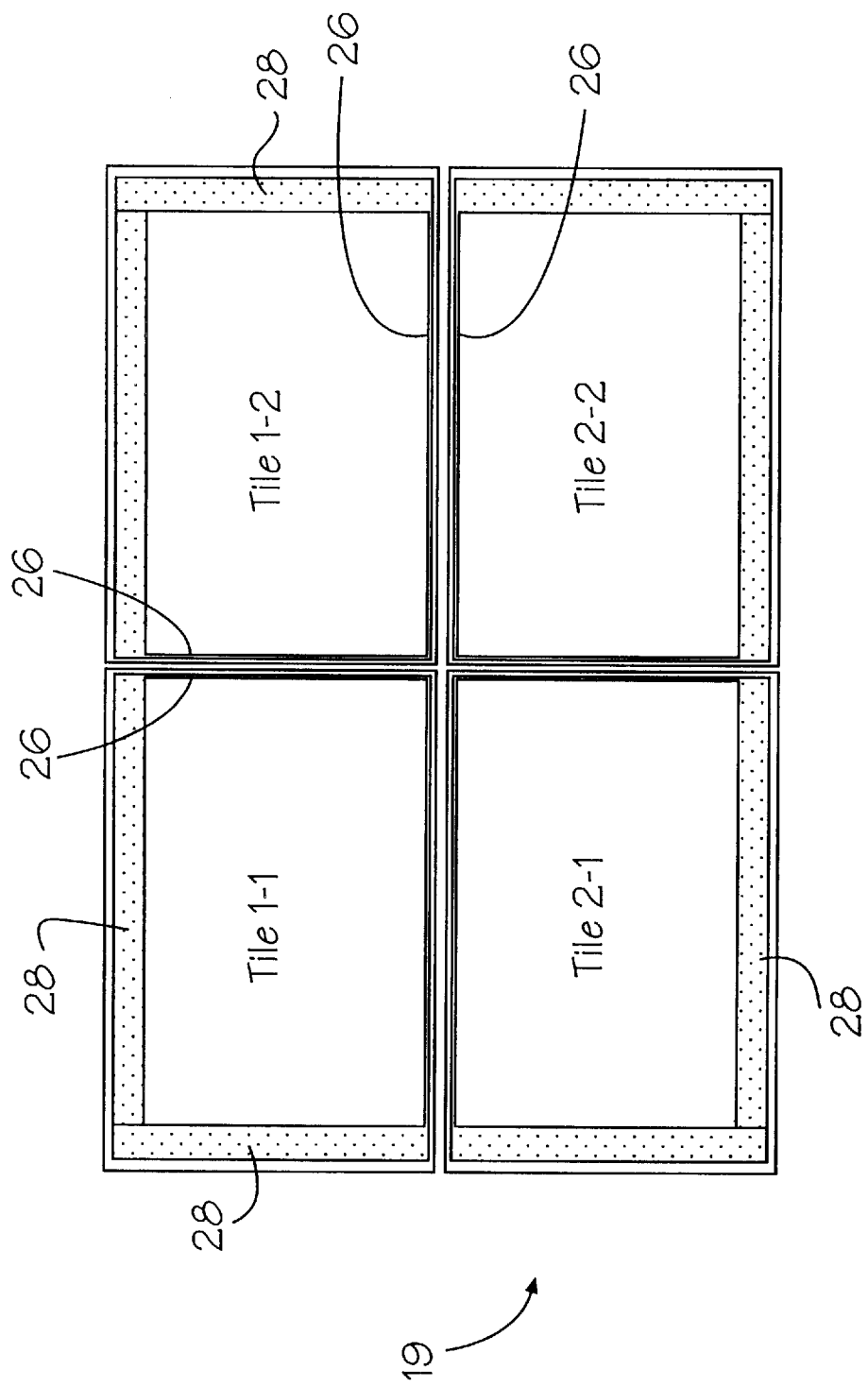
FIG. 5 shows the top view of a 2×2 array of tiles with seals.

FIG. 5 shows the 2×2 array of tiles 19 with the locations of wide seal bands 28 and narrow seal bands 26 illustrated. Tile edges at the overall display perimeter can be wide, while interior seals are narrow. A narrow seal 26 (in the range of 25-to-125 microns or larger) may be fabricated by using a MICRO PEN™-type tool, not shown, described in greater detail in U.S. patent application Ser. No. 08/571,208, filed Dec. 12, 1995, hereby incorporated by reference. An alternative type of narrow seal 26, also described in U.S. patent application Ser. No. 08/571,208, may be fabricated by screening a wide seal in the range of 100 microns or wider, using conventional screening technology on the top plates 12 and/or lower plates 14 of the AMLCD tiles. The top and lower plates of the AMLCD are then joined, and the adhesive is cured. This is followed by precision cutting, which trims the outer perimeter of the seal 26 to any desired dimension, usually between 50 and 125 microns. The latter technique is practical for use in a 2×2 array of tiles, while the former technique is more useful when narrow ledges are desired for joining wires or TABs to interconnect tiles in 2×N arrays, with N>2. Although sufficient for containment of the liquid-crystal material 18 and for providing some mechanical strength, these narrow seals 26 may not be sufficient for long-term exposure to temperature cycling and humid environments. Typically, AMLCDs have wider seals 28 at all four edges of the display, which are useful to leave in place at non-abutting tile edges.

To make a tiled, flat-panel display containing permeable or even semi-hermetic, narrow seals reliable in a humid environment, a robust, additional, outer seal may be constructed to enclose the mosaic of tiles. Alternatively, hermetic and/or semi-hermetic, inner seals can be designed that employ minimum seal dimensions, which may or may not require an outer seal.

The first, preferred approach is to enclose the tiles 10 within glass plates: a backplate 22 (FIG. 3) (which may or may not contain interconnection) and a cover plate 20 (which may contain a mask and additional optical function, e.g., a polarizer, not shown). The tiles 10 are, preferably, mechanically bonded both to the cover plate 20 and the backplate 22 with robust, adhesive seals (i.e., in the range of several millimeters in width), not shown here. Preferably, both the cover plate 20 and the backplate 22 have equal thermal expansion coefficients (CTEs), which are also equal to those of the AMLCD tiles 10. Furthermore, these enclosing glass plates 20 and 22 should have optical properties that are similar to the glass of the AMLCD tiles 10. The most practical approach currently is to use the identical glass used for the tiles 10 (commonly, Corning 1737 glass), but with a thickness of 1.1 millimeters for robustness. The lot-to-lot glass composition variance is generally less than one percent. Since the thermal expansion coefficient is an intrinsic property, the two opposing glass plates 20 and 22 will have only a small variance in CTE (also in the range of one percent), depending on their composition.

The thermal strains in the adhesive joints in the glass stack (20, 12, 14 and 22) are generally accepted to be proportional to the difference in the CTE of the glass, proportional to the temperature difference between the glass plates, inversely proportional to the thickness of the adhesive, and proportional to the distance between the mechanical neutral point of the design and the adhesive joint. The inventive design is mechanically robust, due to the selection of the particular design elements and their symmetrical organization in the glass stack.

Adhesion of polymers to glass is often enhanced by chemical and/or mechanical treatments or combinations thereof to the glass surface. The glass may be micro-roughened by chemical etchant, for example, mixtures of ammonium fluoride, hydrofluoric acid and acetic acid. With this treatment and variables of time and temperature, a broad range of surface roughness may be accomplished.

Polarized polymeric chemicals like AIP-10, A 1100, or a broad range of silicones provide chemical bonding at glass interfaces, preventing deleterious effects from moisture and enhancing mechanical strength.

Combinations of the treatments are particularly effective in preventing shear stress crack growth at the interface between polymers and planar glass surfaces.

In the set of processes making up the AMLCD a polymide coating is used to interface to the liquid crystal. This part of the process is classed as critical since it depends on the cure state of the polymide and a final "rubbing", which apparently orients the polymide molecules sufficiently to create a cooperative effect in the liquid crystal. The polymide area extends to the seal area and may, for narrow seals, cover the glass area to be sealed.

The treatments noted above are generally sufficient to provide adequate adhesion between polymide and glass. The adhesion between the polymeric seal material and the polymide is dependent on interdiffusion of the polymer (generally epoxy) and the polymide—the interdiffusion is dependent on the cure state of the polymide.

Figure 5A:
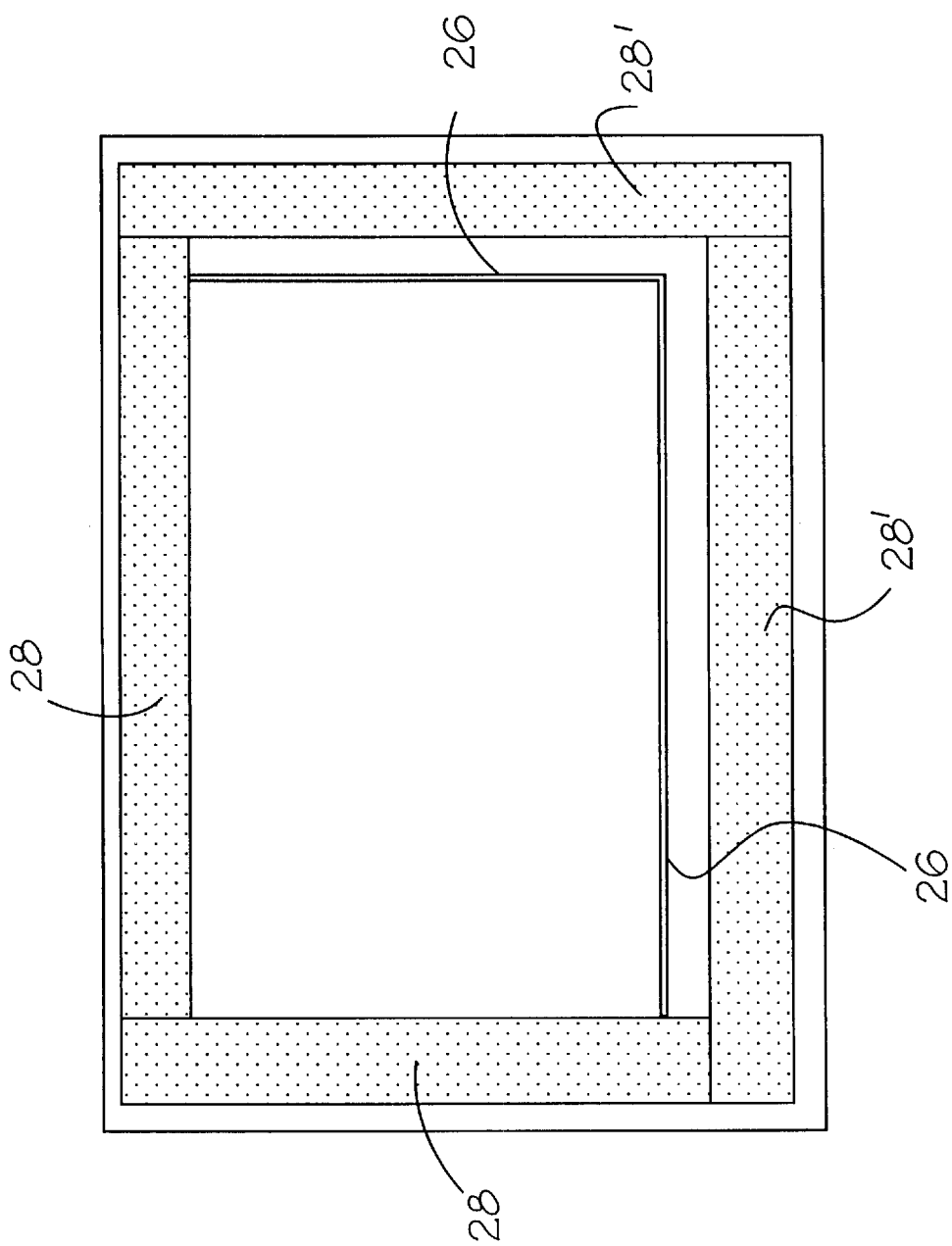
FIG. 5a shows the top view of a tile with a secondary support for saw cutting.

Interdiffusion of seal material, for example, epoxy, into the polymide is strongly dependent on the cure state, being almost imperceptible by ion beam measurement technique for a full, imidized state. Nevertheless, the interdiffusion or chemical bonding may be substantial enough to provide adequate adhesion between the epoxy seal material and the polymide to allow the tiles to be cut without damage. Then secondary seal means along the edges of the tiles may be applied so that the tile withstands further processing and handling—adequate support of top and bottom plates of the tile during cutting (FIG. 5a) may be essential. In this case an outer seal 28' outside the inner, narrow seal 26 by slightly more than a sawblade width provides the desired support.

An alternative to sealing the tiles on a polymide interface is to remove the polymide, leaving either a clean glass interface or one optimized for adhesion and mechanical integrity as described previously. The polymide may be removed locally in the narrow seal area. A practical approach is to plasma etch the material selectively using the same mask as that used to screen the adhesive. Although alternative masking and chemical processing techniques may be possible, the chosen technique must be compatible with the "rubbed" polymide surface retaining its cooperative interaction for orienting the liquid crystal. Lift-off masking techniques may be used to remove unwanted polyimide. Likewise, masking followed by etching, e.g., KOH solution, may be used.

For a 2×2 array 19 of AMLCD tiles 10 in the above embodiment, the backplate 22 of the AMLCD tiles 10 extends beyond the top plate 12 of the tiles 10 and beyond the cover plate 20. The interconnection for the AMLCD electronics extends a predetermined distance on the lower plate 14, for easy access to wire, TAB or other interconnections, which connect to PCB electronics surrounding the FPD.

Seals 28 on the top and left sides of tile 1-1 can be relatively wide because they are outside the display's pixel field. Seals 26 on the bottom and right sides of the tile 1-1 are preferably narrow, so as to accommodate the pixel pitch with a desirable aperture efficiency throughout the display. Sealing of the cover plate 20 to the top plate 12 of the tile 1-1 is accomplished as decribed hereinbelow.

Figure 6:
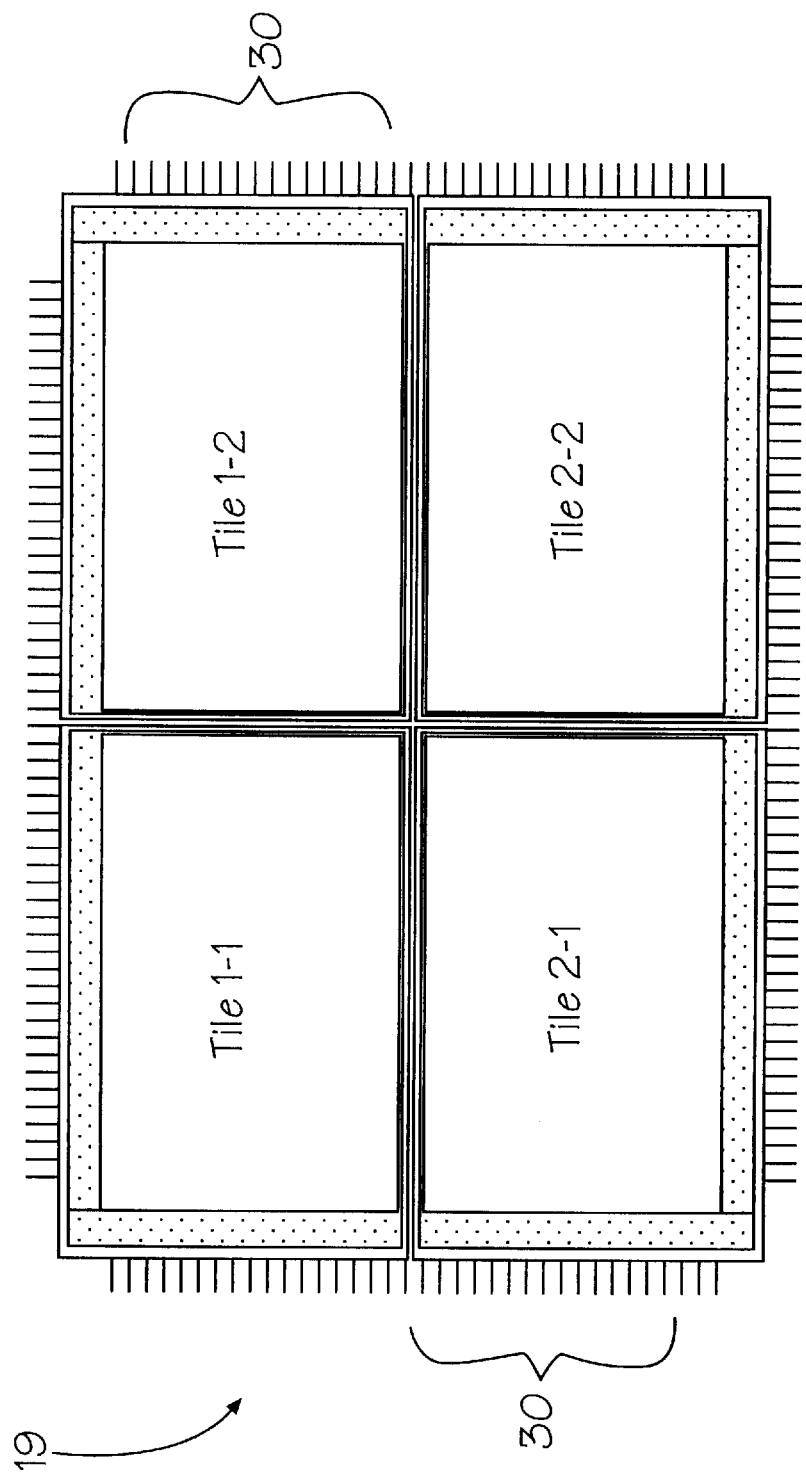
FIG. 6 shows the view of FIG. 5 with external, electrical-connection locations.

FIGS. 6 and 7 show the location of electrical connections 30 to the array 19. Sealing integrity should be maintained while making these connections.

Figure 9:
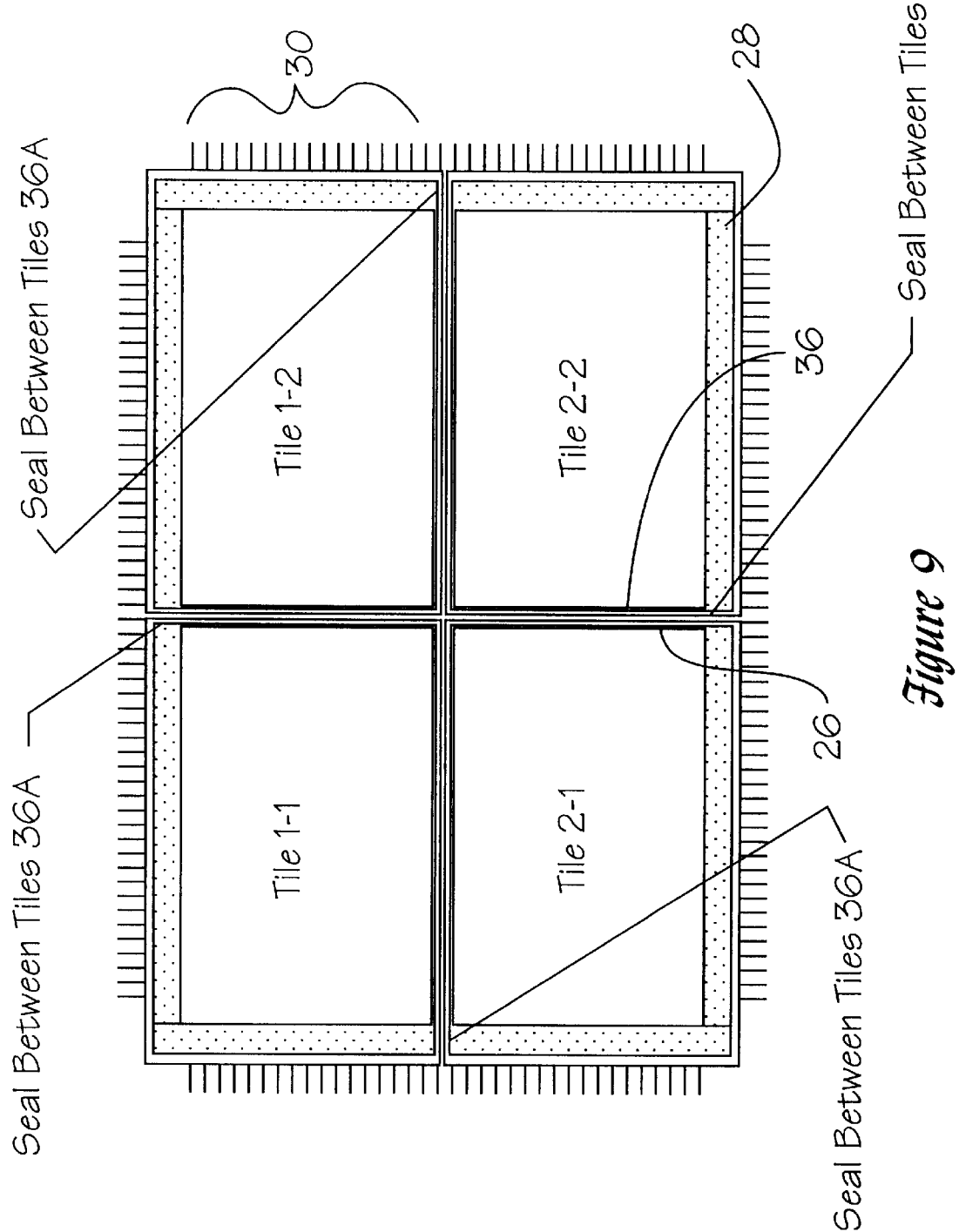
FIG. 9 shows a top view of FIG. 8.

FIGS. 8 and 9 show a preferred approach to solving both the mechanical and environmental problems of sealing. Tiles 10, the edges of which have narrow seals 26, are enclosed with the glass cover plate 20 and the backplate 22. These plates 20 and 22 are adhesive-bonded by robust seals 32 and 34, respectively, to the tiles 10 on the outside perimeter of the tiled display. Since they are outside the viewing area, there is a liberal design freedom associated with the width, thickness and mechanical strength of the seals 32 and 34. The glass enclosure (plates 20 and 22) is preferably matched in thermal expansion to the AMLCD tiles 10 (FIG. 1). In this embodiment, where the two tiles 10 adjoin, the vertical seams 36 are sealed on the outside perimeter with a small amount of polymer 36a, which may be dispensed with a dropper, syringe or other suitable means. In this approach, the AMLCD tile's lower plate ledge 38, which contains the monolithic interconnection emerging from the seal, is left open for bonding to the drivers and control circuits, not shown, outside of the tiled, FPD area. The interconnections 30 can thus be made as if the FPD were monolithic.

Figure 10:
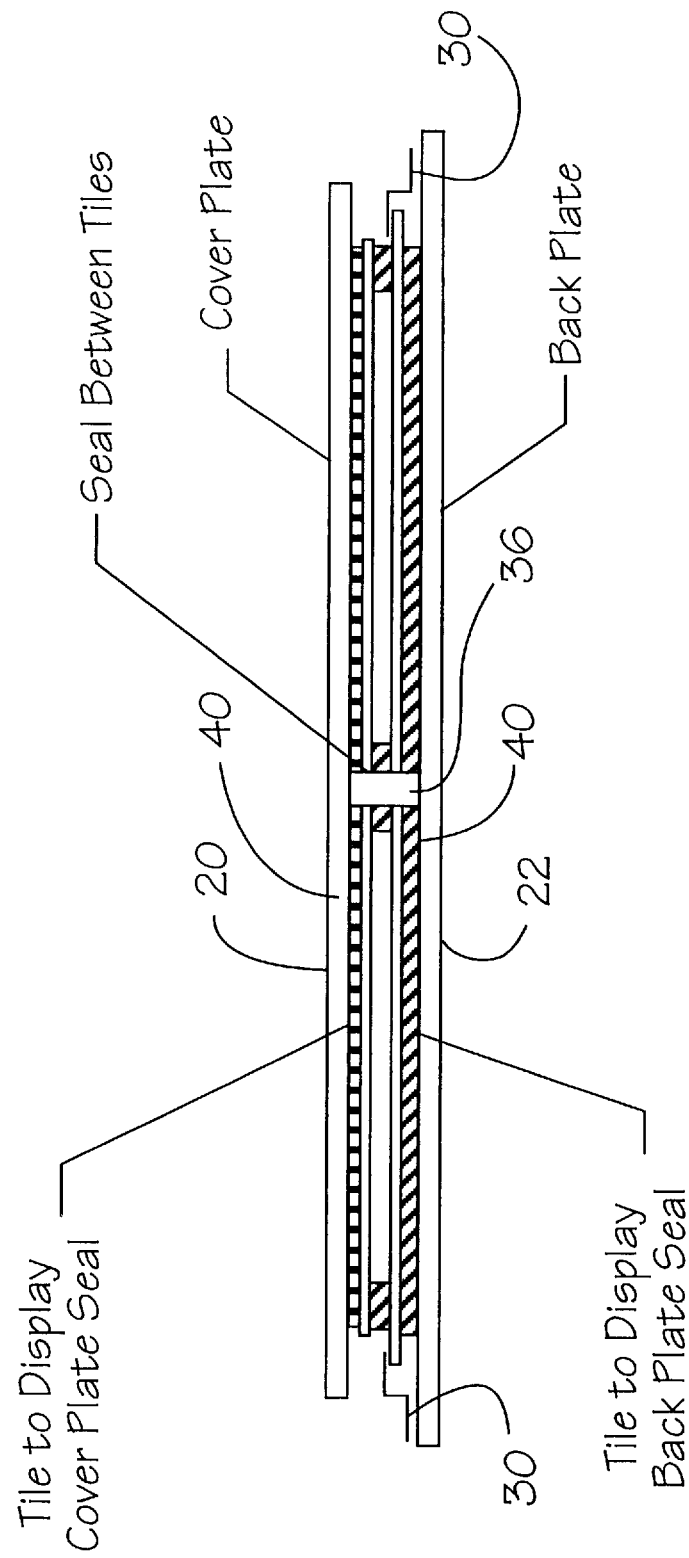
FIG. 10 shows full-face sealing of a 2×2 array.

FIG. 10 shows an alternative structure having the tile's entire top face of the top plate 12 and bottom face of the lower plate 14 adhesive-sealed 40 to the FPD coverplate 20 and backplate 22.

Figure 11:
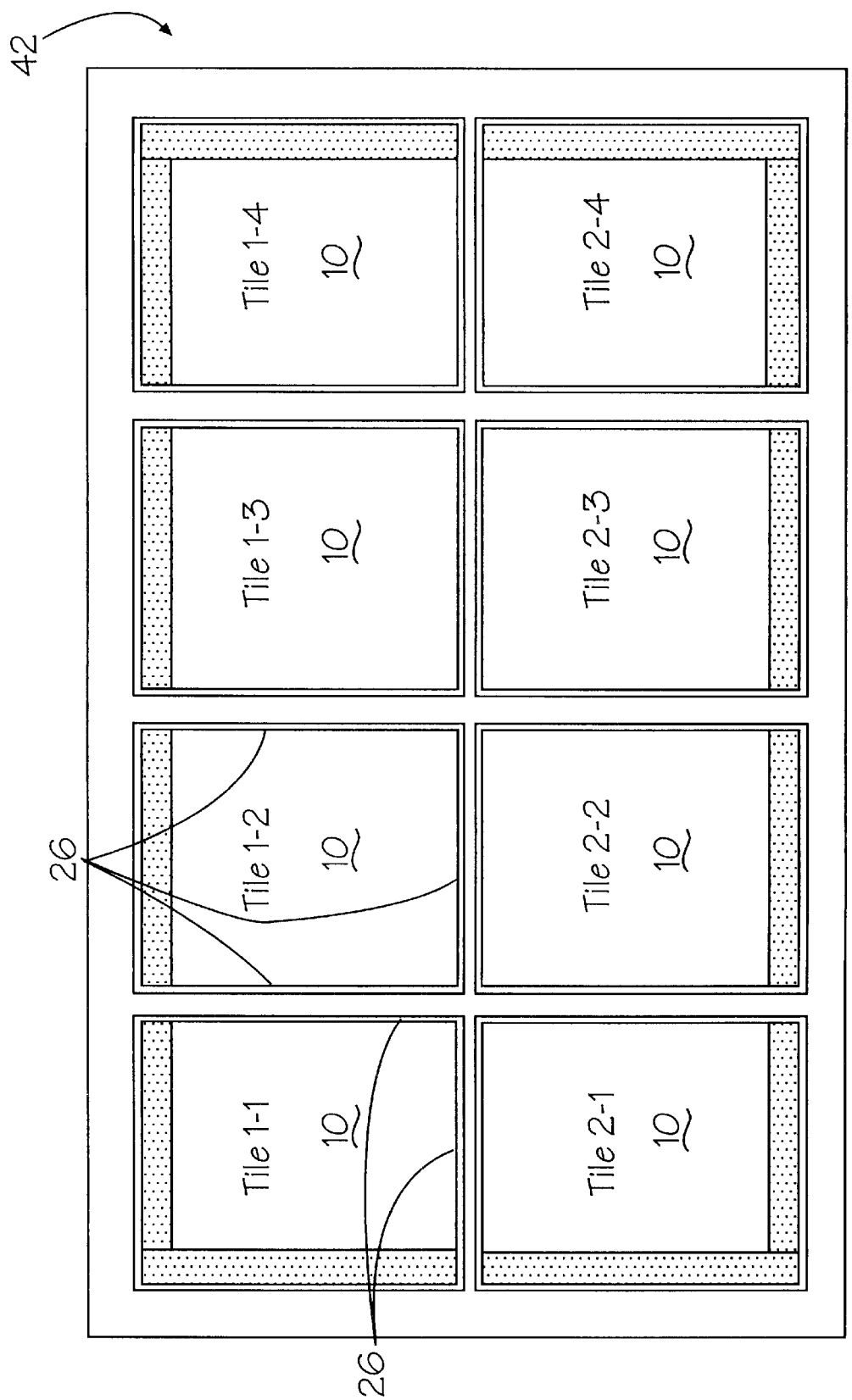
FIG. 11 shows the top view of a 2×4 array of tiles with seals.
Figure 12:
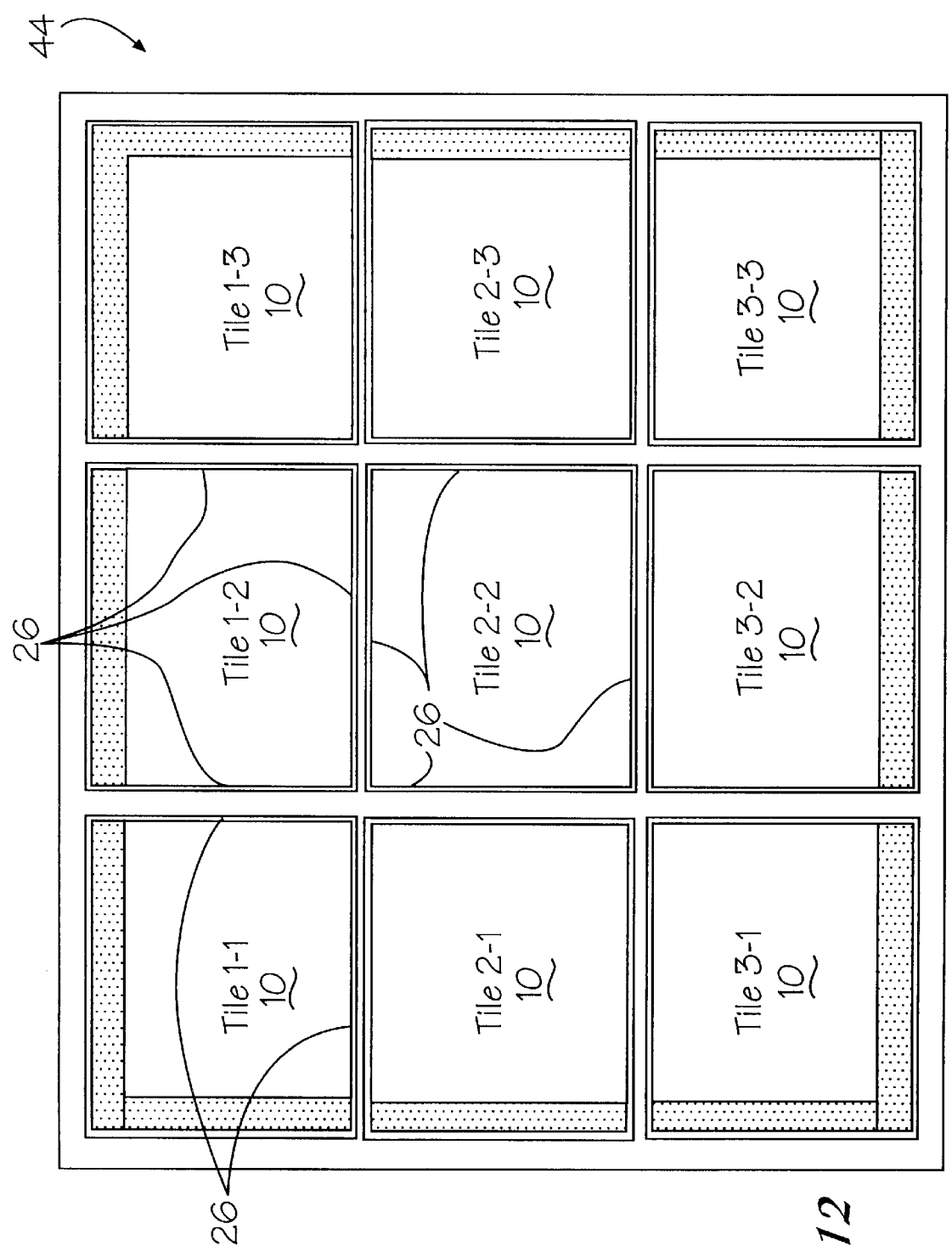
FIG. 12 shows the top view of a 3×3 array of tiles with seals.

FIG. 11 shows a 2×4 array 42 of tiles 10. It can be seen that individual tiles 10 have either two or three edges with narrow seals 26. In FIG. 12, showing a 3×3 tile array 44, two or more of the edges of each tile have narrow seals 26. The sealing concepts shown in FIGS. 8, 9 and 10 can also be used with these designs.

To reach the internal tiles in a tiled array design with more than four tiles (for example, a 2×N array), either a backplate with interconnections or multilevel interconnections is needed. When the backplate contains interconnections (FIG. 23), the tiles may be interconnected to the backplate with TABs, wire bonds or alternatives. These designs, described in greater detail hereinafter, allow the cover plate to be sealed to the backplate around the entire perimeter of the tiles and over the thin film interconnections on the backplate.

Figure 13:
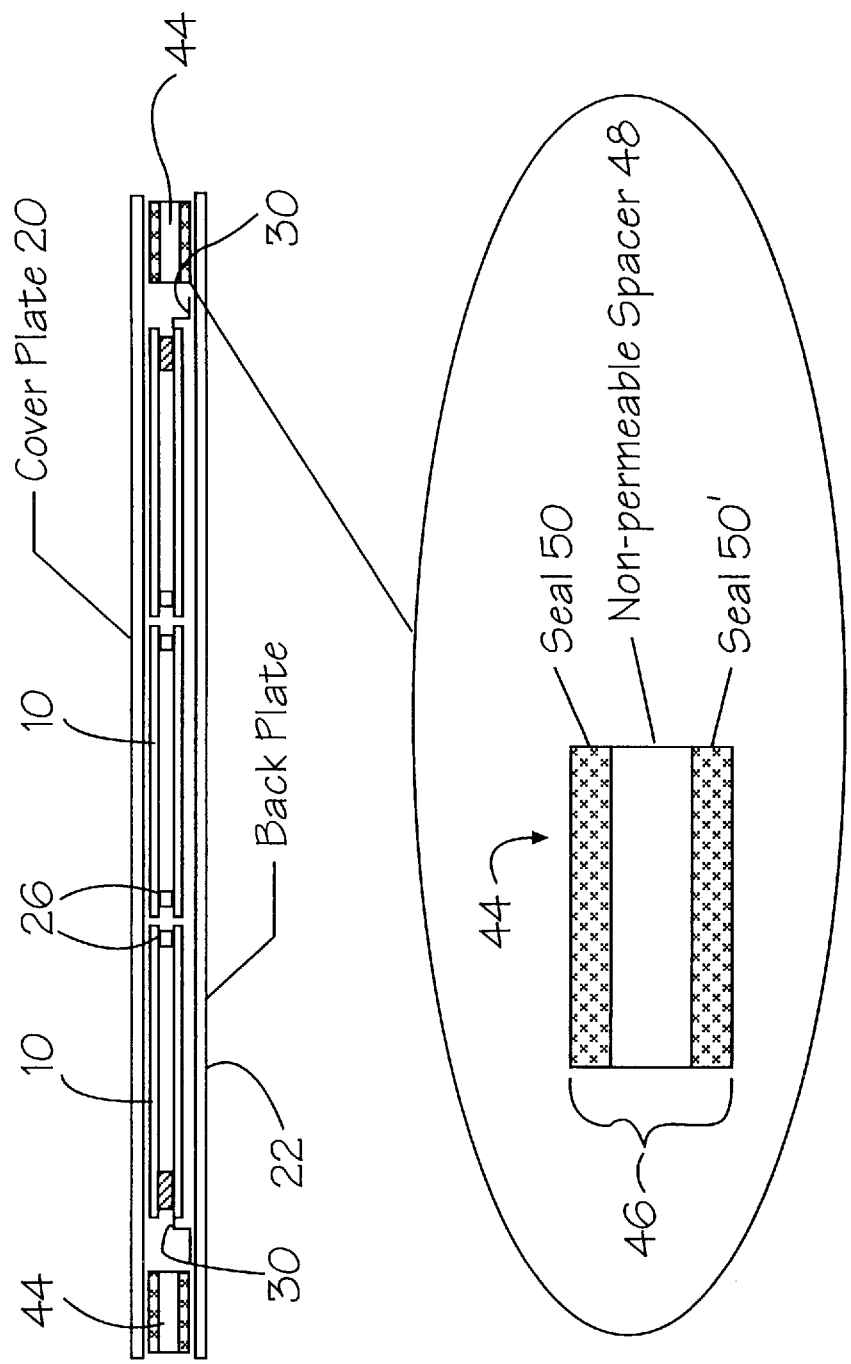
FIG. 13 shows a preferred method of sealing, utilizing a non-permeable spacer.

FIG. 13 shows a preferred, alternative sealing concept, in which the backplate 22 may be circuitized with thin films for a 2×N array. Electrical connections 30 are made between the tiles 10 and the backplate 22 when the backplate is circuitized. The composite seal 44 may be constructed between the backplate 22 and the cover plate 20.

In this case, the height 46 of the composite seal 44 is approximately equal to the thickness of the two glass plates 12 and 14 making up the AMLCD tile 10, plus any spacing between the AMLCD tile 10 and the backplate 22 and between the AMLCD tile 10 and the cover plate 20. This additional space may contain interconnections, one or more polarizers and a mask, not shown, as well as adhesive with spacers to establish coplanarity within the tiles and the cover plate.

Therefore, when the AMLCD glass plates 12 and 14 are each 0.7 millimeters, the total space to seal will be larger than 1.4 millimeters. With these dimensions, if sealed with epoxy, the large circumference of the FPD would increase the permeation by orders of magnitude compared to those for conventional AMLCD displays with 1-to-4-millimeters-wide, but only 5 $\mu$m thick, seals. This problem may be solved by the utilization of the composite seal 44, consisting of a combination of non-permeable material 48 filling the space, along with conventional polymeric seals 50 and 50', which provide adequate environmental protection. In the preferred embodiment, glass or alternative spacers are bonded between the cover plate 20 and the backplate 22 with polymeric seal materials. Seal widths may be in the range of several millimeters, while the polymeric seal adhesive may be in the thickness range of several microns (similar to the seals used for monolithic FPDs). As an alternative to connecting to the circuitized backplate 22, electrical feed-throughs, not shown, may be contained in the non-permeable seal, with external and internal connections to the feed-throughs.

FIG. 13a shows an alternative sealing concept, in which an end cap 48' surrounds the display at the perimeter and is sealed 50" to the cover plate 20 and the backplate 22. Electrical feed-through connections 30' penetrate and are sealed in the end cap 48'.

Four design embodiments on the tiles 10 may eliminate the need for an outer seal and the need for a backplate in a 2×2 tile design. The first design embodiment applies to 2×2 tile array designs (e.g., 19 in FIGS. 2 and 6) and incorporates a strip of thin metal film 52, which is adhesive-bonded to the two edges 54 and 56 of the tile 10 shown in FIG. 14. The strip of metal film 52 may be continuous around the corner 58, or may be two separate pieces, as shown. The adhesive in this case may be substantially thinner than the conventional, 5-micron seal used in AMLCDs. The strip of metal film 52 is impermeable; therefore, the diffusion path is through the thin adhesive for a distance that is equal to the thickness of the glass 12 or 14 (typically, 0.7 millimeters), then through the 5-micron seal 26 of the tile 10 to the liquid-crystal material 18. This technique has a diffusion length comparable to a conventional AMLCD and is, therefore, expected to provide adequate semi-hermetic performance. The mechanical robustness is determined by the thickness and the strength of the strip of metal film 52, and is expected to result in one or two orders of magnitude of greater strength than the epoxy polymers that are currently used for sealing.

A second embodiment eliminating the need for an outer seal and a backplate consists of coating the AMLCD edges with material made of Parylene™, or other materials such as liquid-crystal polymer, having an exceptionally low permeability and/or solubility for water. Parylene™ material can be deposited by sublimation, forming a conformal coating with essentially equal thickness on edges 54 and 56, corners 58 and crevices, as well. This Parylene™ can be used in conjunction with the narrow seals 26 between the plates 12 and 14. FIG. 15 shows the edges of an individual tile 10 before coating. All four edges may, of course, be coated; the entire tile 10 may even be coated, if the necessary steps are taken to maintain optical transparency and electrical connection integrity.

Figure 16:
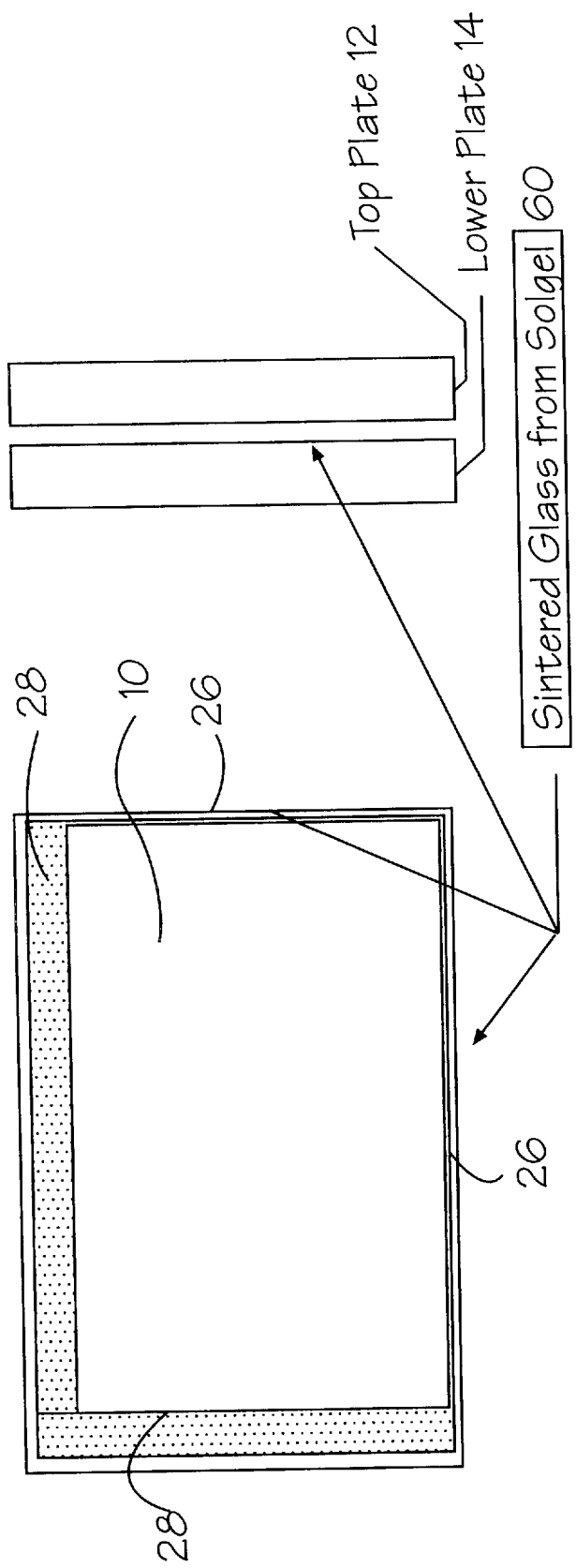
FIG. 16 shows an extremely fine, tile-sealing method.

As a third embodiment, forming improved narrow seals 26, and referring now to FIG. 16, one may replace the polymer adhesive with a material that prevents the diffusion of water. One preferred seal material is a Solgel glass composition 60 which sinters in the temperature range below the recrystallization temperature of amorphous silicon. Silica Solgel materials 60 sinter in the range of 300° C. to 400° C., a temperature which is acceptable for polysilicon AMLCD; this is an emerging technology. However, temperatures in the range of 300° C. to 400° C. could cause the amorphous silicon that is used for the transistor in current AMLCD technology to recrystallize. Lower sintering temperatures for Solgel may be achieved by using glass compositions containing lead and other elements. With the desired elements in the glass, it may be feasible to sinter the Solgel at temperatures which the amorphous silicon can withstand.

The Solgel seals 60 are deposited with a MICRO PEN™ in the same way as are narrow polymer seals. Spherical glass spacers or alternatives of desired diameter, are preferably mixed with the Solgel to control the spacing between the top and bottom plates of the tile. A vacuum bake sinters the seal in place. Localized heating (e.g., by laser) can be used to repair the sintered Solgel seals.

Glass seals 60 produced in the manner discussed have several advantages. First, the glass seal prevents the diffusion of moisture. Secondly, the strength of the material and the bonding provides increased mechanical reliability. Finally, as the processing is learned, seals may be constructed that are as narrow as can be effectively deposited (e.g., in the range of one-thousandth of an inch wide). The Solgel seal approach is adaptable to all edges of the tiles 10, including those that contain interconnections.

A fourth embodiment of a seal for application to 1×2 or 2×2 AMLCD tile arrays uses an SnPb, an SnBi or an alternative solder with melting temperatures in the desired range. In this design, a sputtered or evaporated thin metal film (such as chromium) is used as the adhesive element for the glass; a copper film is superimposed to form a wettable interface that is adaptable for soldering. A convenient processing configuration is a set of AMLCD tiles stacked on edge. The metal film is sputtered on the edges of both the top plate 12 and lower plate 14 of multiple tiles concurrently. This is followed by a solder application to the metallized edges, bridging the 5-micron gap between the lower plate 14 and the top plate 12. Solder can be applied by many methods well known in the art.

The advantage of this fourth approach is that solder bridges the 5-micron gap between the lower 14 and top plates 12 of a tile 10 with a truly hermetic seal. Furthermore, on cooling, the solder creates a compressive stress on the two plates, holding them in place in spite of substantial shear or tensile forces.

In the field of tiled AMLCDs, optical matching at the interfaces is desirable and may be accomplished (at least, partly) by selecting suitable AMLCD tiles. If the matching from tile to tile is not adequate, electronic trimming of the individual, color light-valves, as described in copending U.S. Pat. No. 5,661,531, may be desirable.

Figure 17:
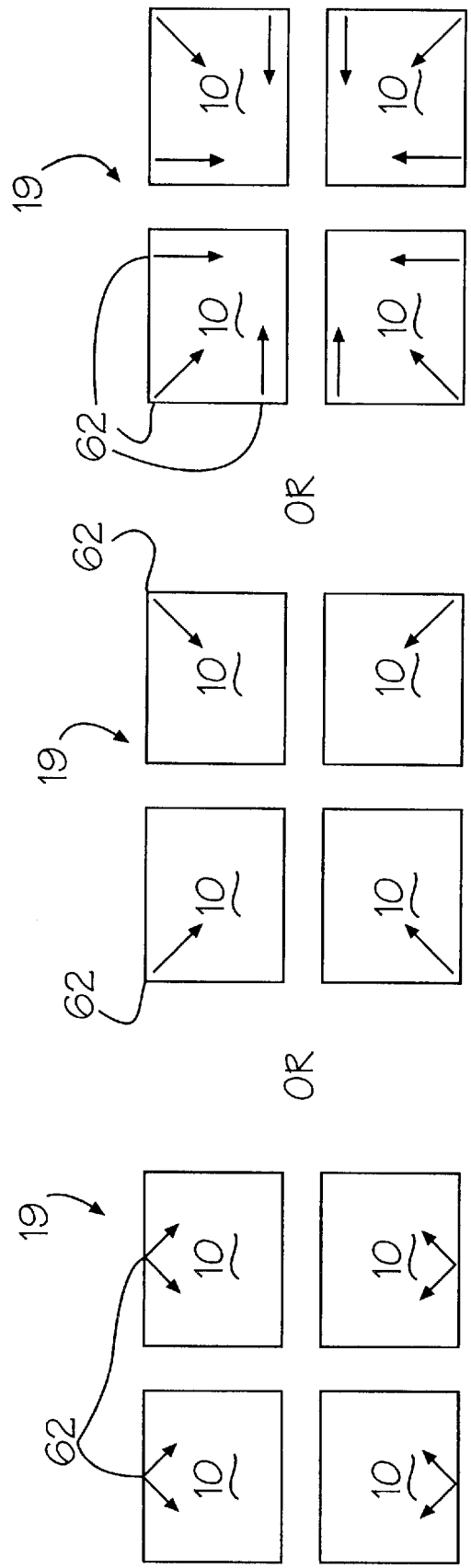
FIG. 17 shows preferred fill-port locations for 2×2 arrays.
Figure 18:
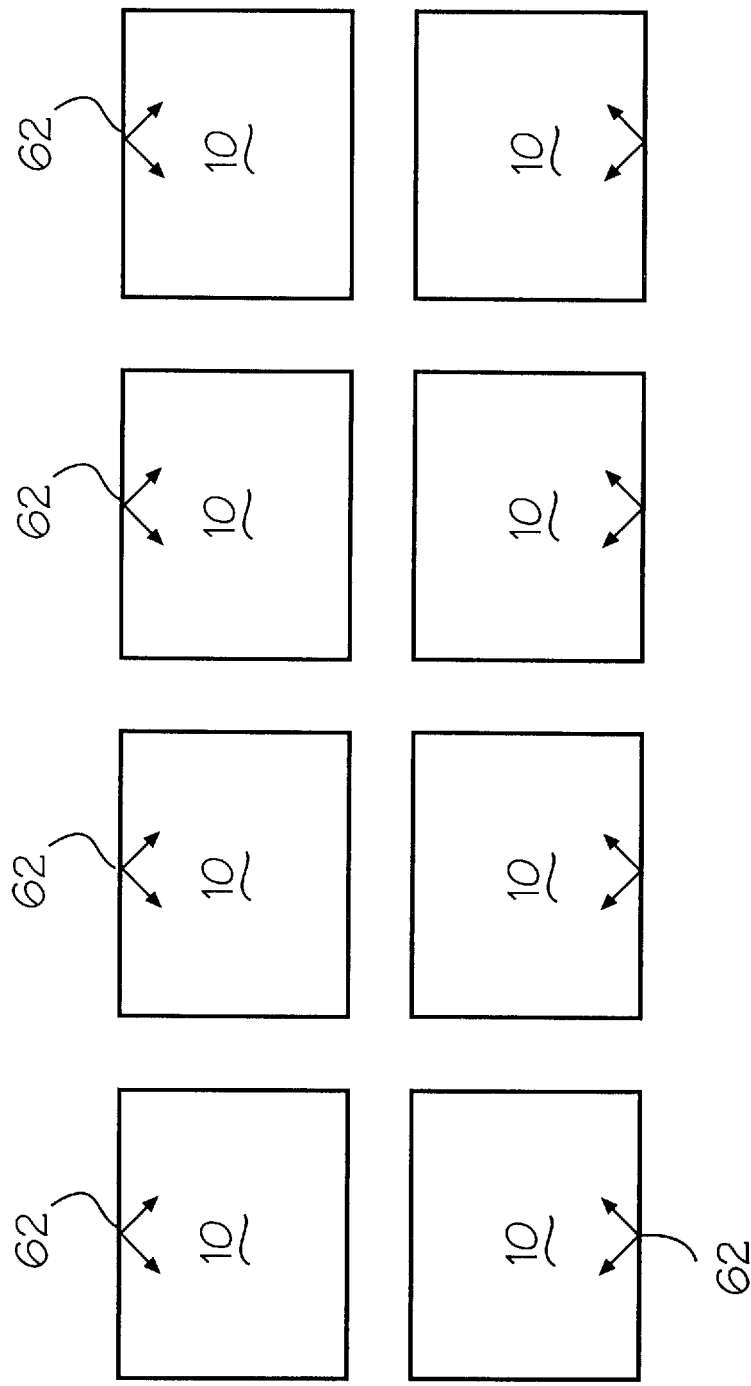
FIG. 18 shows preferred fill-port locations for 2×4 arrays.

FIG. 17 shows examples of the location of ports for a 2×2 array of tiles. FIG. 18 shows port locations for 2×M, where M is an integer greater than 2. Liquid-crystal material 18 is flooded into the space between the top 12 and lower plates 14 of a tile 10 by immersing the structure in a bath of liquid-crystal material 18 in a vacuum environment. The liquid-crystal material 18 enters the space between the glass plates 12 and 14 through "ports" 62 in the seal. Where two tiles are adjacent at a seam, the optical response of the neighboring areas, tile to tile, should be as close to identical as possible. The locations of fill ports 62 are situated so as to ensure that the liquid-crystal material 18 flows in a symmetrical pattern with respect to the pattern of adjacent tiles 10 in the array, thus promoting improved optical uniformity. Optical discontinuity may be minimized by maintaining the fill ports 62 on the edges of the tiles 10 in a symmetrical arrangement, with respect to the perimeter of the FPD.

Figure 19:
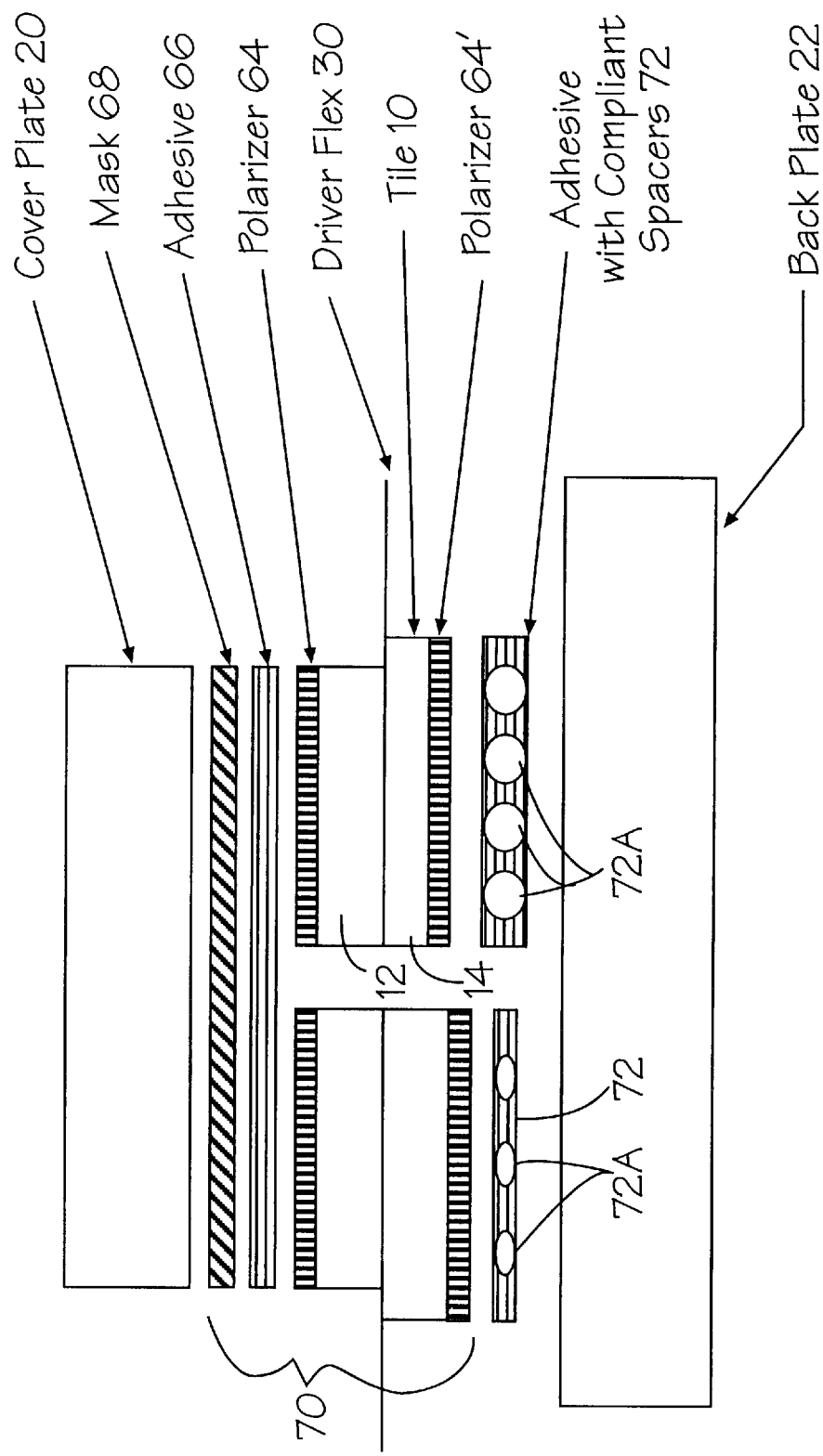
FIG. 19 shows a display screen assembly.

Referring now to FIG. 19, in the preferred assembly of the display screen, polarizers 64 and 64' are adhesive-bonded to the top 12 and lower plates 14, respectively, of each tile 10. A continuous adhesive 66 bonds the tiles 10 with polarizers 64 to the cover plate/mask assembly 20 and 68. A film, not shown, which may be removed by peeling prior to bonding, may be used to protect the adhesive 66. Alternatively, the sealing method shown in FIGS. 8 and 9 may be used. The top surfaces of the tiles 10 with polarizers 64 attached may be registered and bonded to the cover plate/mask assembly, 20 and 68. This assembly sequence maximizes co-planarity at the viewing surface.

TABs, wires or other connecting means 30 are preferably attached to pads, not shown, on the tiles 10, before the tiles 10 are bonded to the cover plate 20. The tiles 10 may then be functionally tested prior to being committed to assembly. Tiles can be characterized as "Known Good Tiles" (KGT), which is similar to the concept of "Known Good Die" (KGD) in the assembly of multi-chip modules in the electronics industry.

Figure 20:
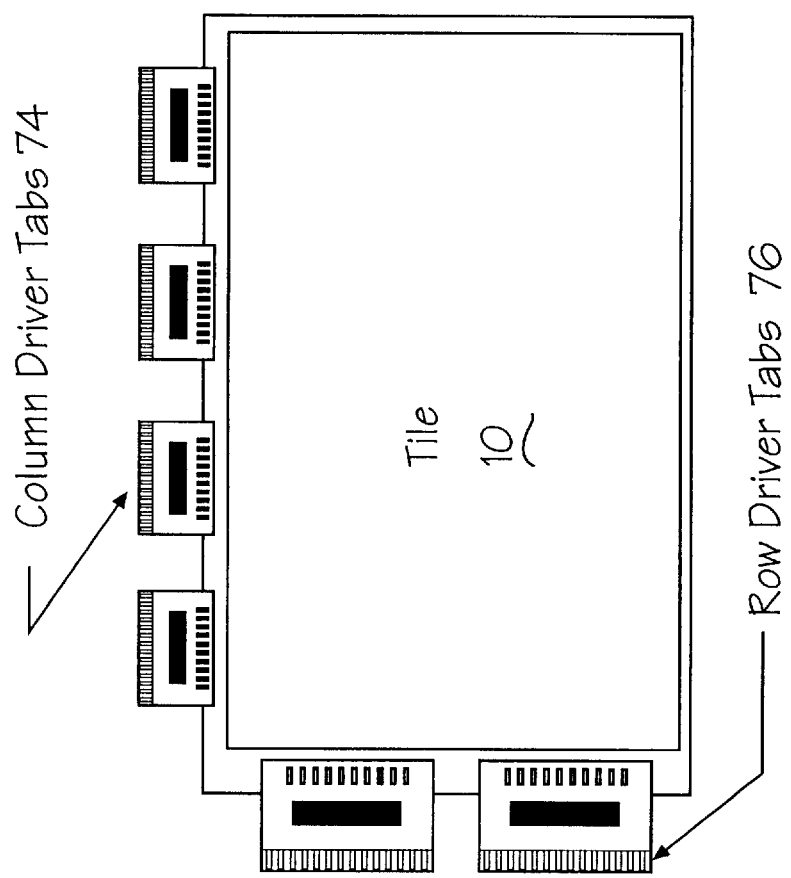
FIG. 20 shows a single tile with driver TABs.

FIG. 20 shows a single tile 10 with column driver—and row driver TABs 74 and 76, respectively, attached for KGT characterization. A multi-tile assembly may also be tested prior to its attachment to the backplate (if used), and prior to any further assembly.

To achieve coplanarity with the cover plate 20 in the 2×N array, compliant spacers 72a are used underneath the tiles. These are contained in sufficient proportion in the adhesive 72 and 72', supporting the individual tiles 10 until an additional pressure is applied. The size of the polymer spacers is designed to be greater than the maximum tolerance accumulation difference for the tiles in the array. When pressure is applied with the cover plate assembly 20, the spacers 72a collapse beneath the thickest tiles, until the tiles 10 are coplanar on the surface of the cover plate 20. This method of assembly can also be used for a 2×2 (or smaller) array.

In the case of 2×N arrays, a sequence is preferred in which the tiles are assembled to the backplate first, but are made co-planar to the cover plate. The steps to manufacture 2×N arrays include:

1) assemble connections to the tiles for testability;
2) test for Known Good Tiles;
3) assemble four Known Good Tiles to the backplate with all leads on the outside perimeter for rework, if necessary;
4) orient the tiles to make them coplanar with the cover plate prior to bonding them with adhesive to the backplate; and 5) add Known Good Tiles to the array, two or four at a time, for respective 2×3 or 2×4 arrays; leads are always on the outside edges for test and rework.

Figure 21:
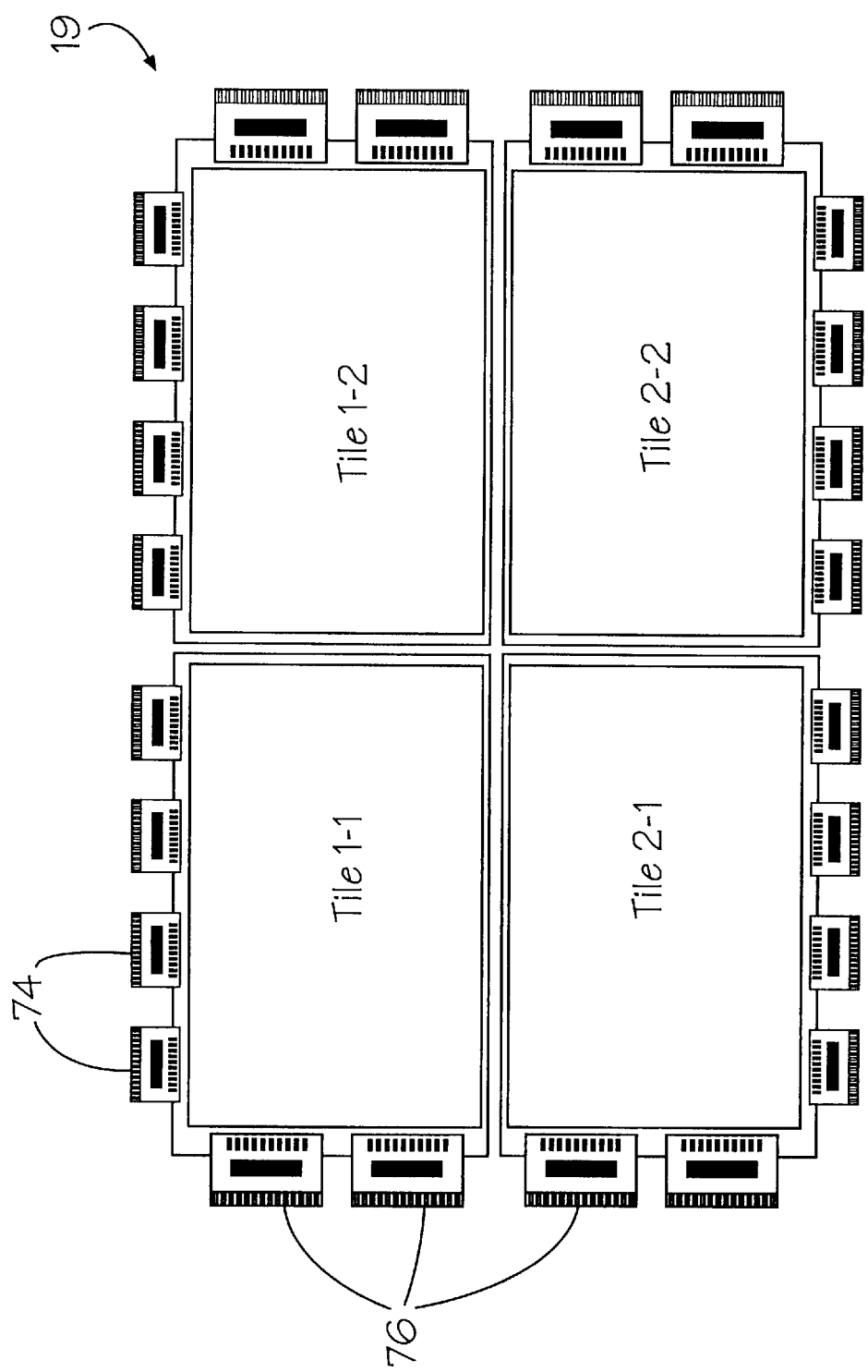
FIG. 21 shows a 2×2 array of tiles with row and column drivers.

In a monolithic display, row drivers and column drivers may drive lines across the total length and width of the AMLCD. In a tiled FPD (such as the 2×2 array 19, shown in FIG. 21), a choice may be made as to whether to provide jumper interconnection means (such as from tile 1-1 to tile 1-2 for row lines), or provide drivers for each tile along the peripheral edges, as shown in FIG. 21.

Figure 22:
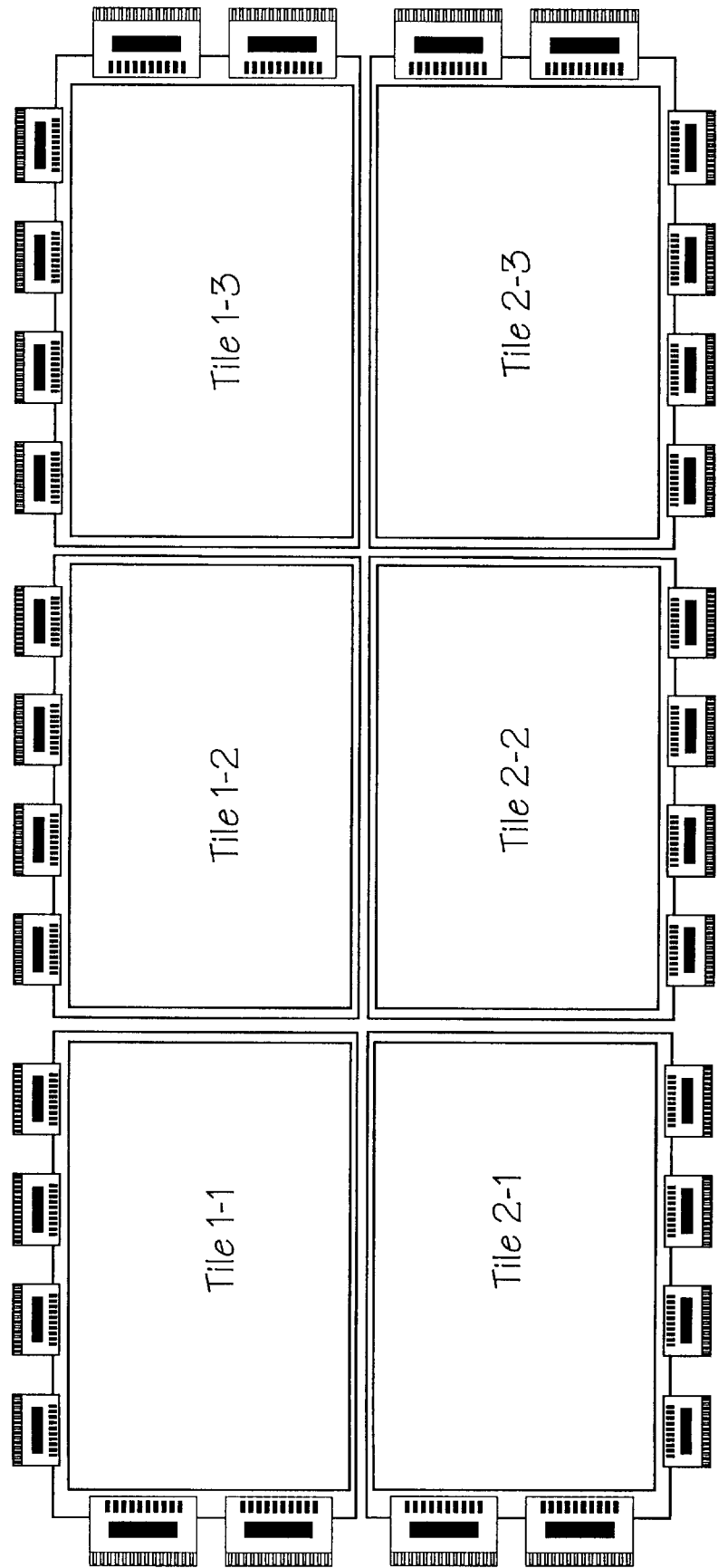
FIG. 22 shows a 2×3 array of tiles with row and column drivers.
Figure 23:
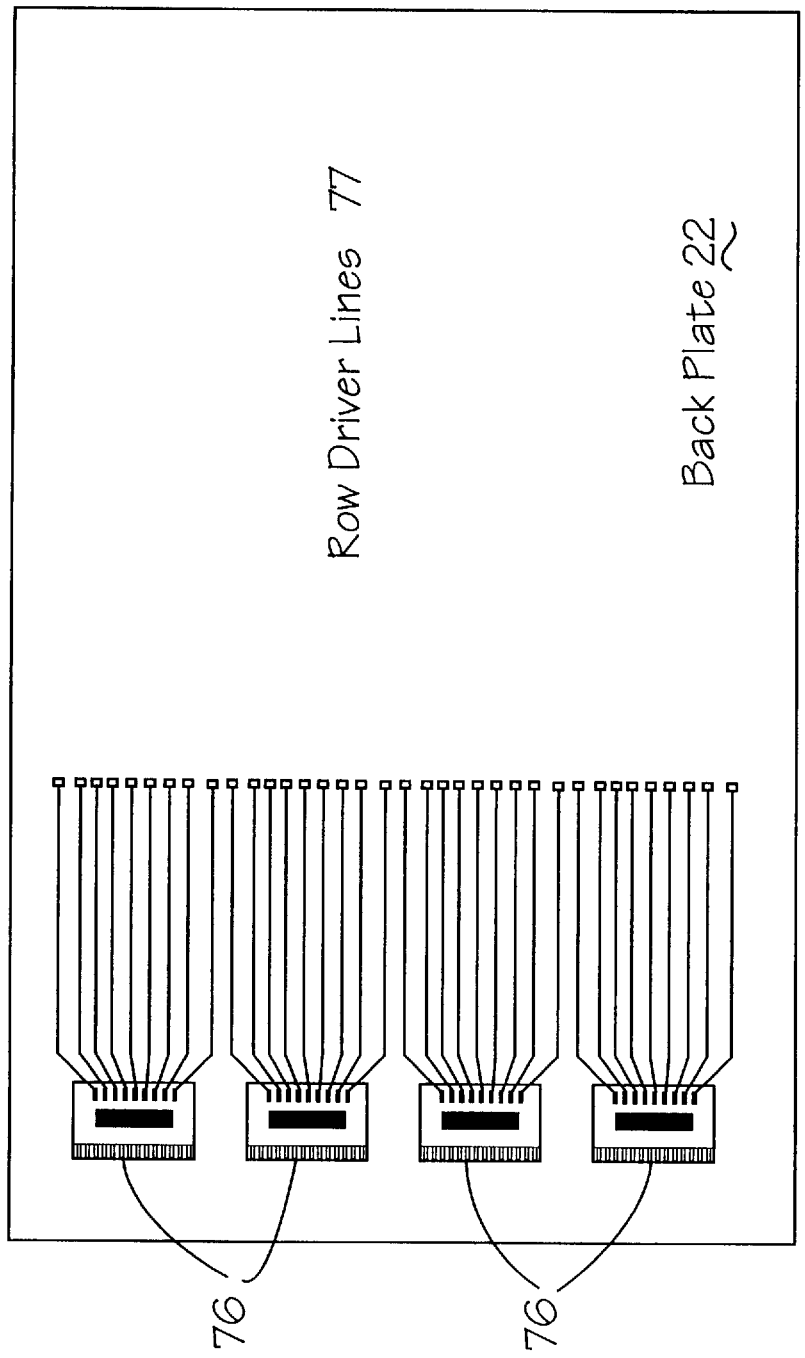
FIG. 23 shows row lines on the backplate for the tiled array shown in FIG. 22.

Referring now to FIGS. 22 and 23, driver lines 77 for interior tiles of arrays greater than 2×2 are provided on the backplate 22, so as not to disturb optical transmission. For example, tiles 1-2 and 2-2 have driver lines external to the tiles, e.g., on the top surface of the backplate. These row driver lines 76 may be shared with other tiles (e.g., 1-1, 1-1 and 2-1, 2-2), or they may be dedicated to the inner tiles (e.g., 1-2, 2-2). If drivers are shared, means may be provided to connect each tile to the appropriate line on the backplate.

The drivers for tiles 1-1, 2-1, 1-3 and 2-3 are not shown in FIG. 23. For tile arrays greater than 2×2, similar arrangements may be employed for either row driver lines 76 or column driver lines, not shown in FIG. 23, or both. Arrays greater than 2×2 in each direction may have driver lines in a two-layer interconnection structure on the backplate, or with one layer provided on the backplate and another on a separate means interposed between the backplate and the tiles. Alternatively, tile-to-tile jumpers may eliminate the need for backplate circuitization in either or both directions.

Figure 24:
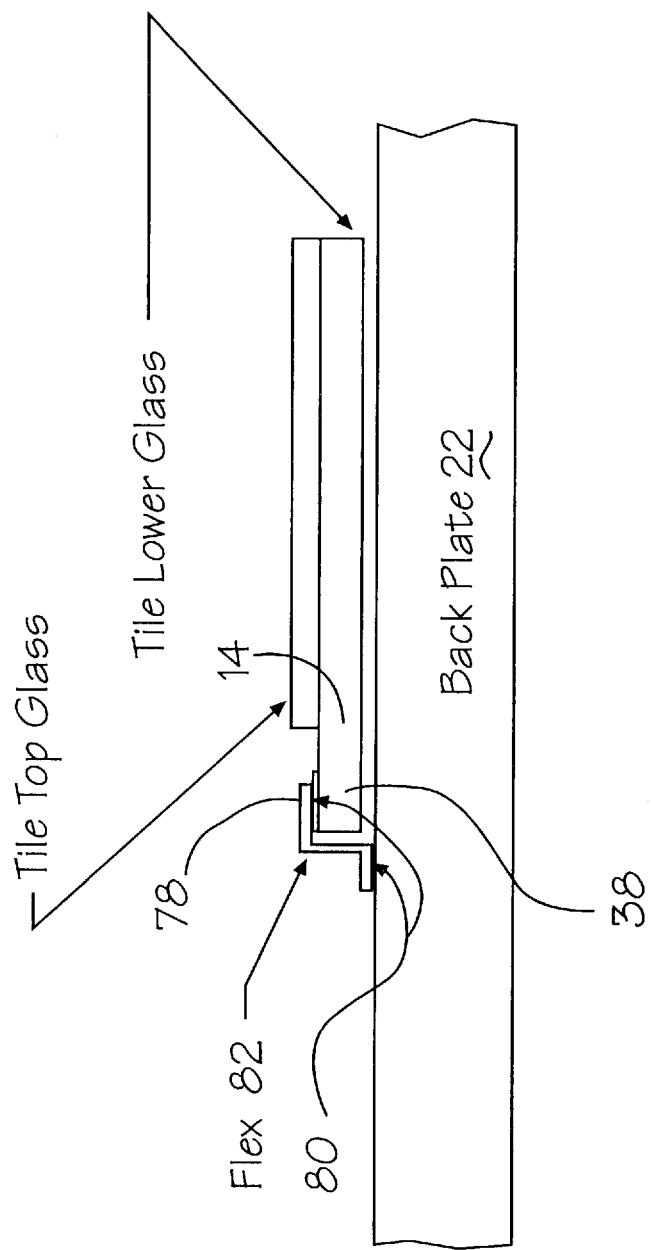
FIG. 24 shows the side view of flex connections to the inner tiles of a 2×N array of tiles.

FIG. 24 shows the connection design for providing row driver inputs to the inner tiles of the array shown in FIG. 22. Column driver inputs for the inner tiles may be provided at the display perimeter, but row driver inputs (having passed under tiles 1-1 and 2-1 on the backplate 22) must be connected to the pads 78 on the lower plates 14 of tiles 1-2 and 2-2. These pads 78 are located on a narrow (approximately 0.1 mm) ledge 38 of the tile. Since only one line per pixel is required for row drivers, the pitch of these pads 78 may be a significant percentage of the pixel pitch.

In typical tiled displays, the pixel pitch may be greater than a few tenths of a millimeter. Reliable connections, using an isotropic conductive adhesive 80, require multiple points of contact at each pad 78. Feasible ledge dimensions allow the use of TABS with widths approaching a full pixel pitch for isotropic conductive interconnects 80. This fulfills the multiple contact requirement for an isotropic adhesive 80 on the ledges 38 of tiled displays. Such connections may be made between the flex 82 and the backplate 22, and between the flex 82 and the pad 78 on the tile's lower plate 14. Other connection technologies, such as thermo-compression bonding (TCB) or soldering, may also be employed.

Figure 25:
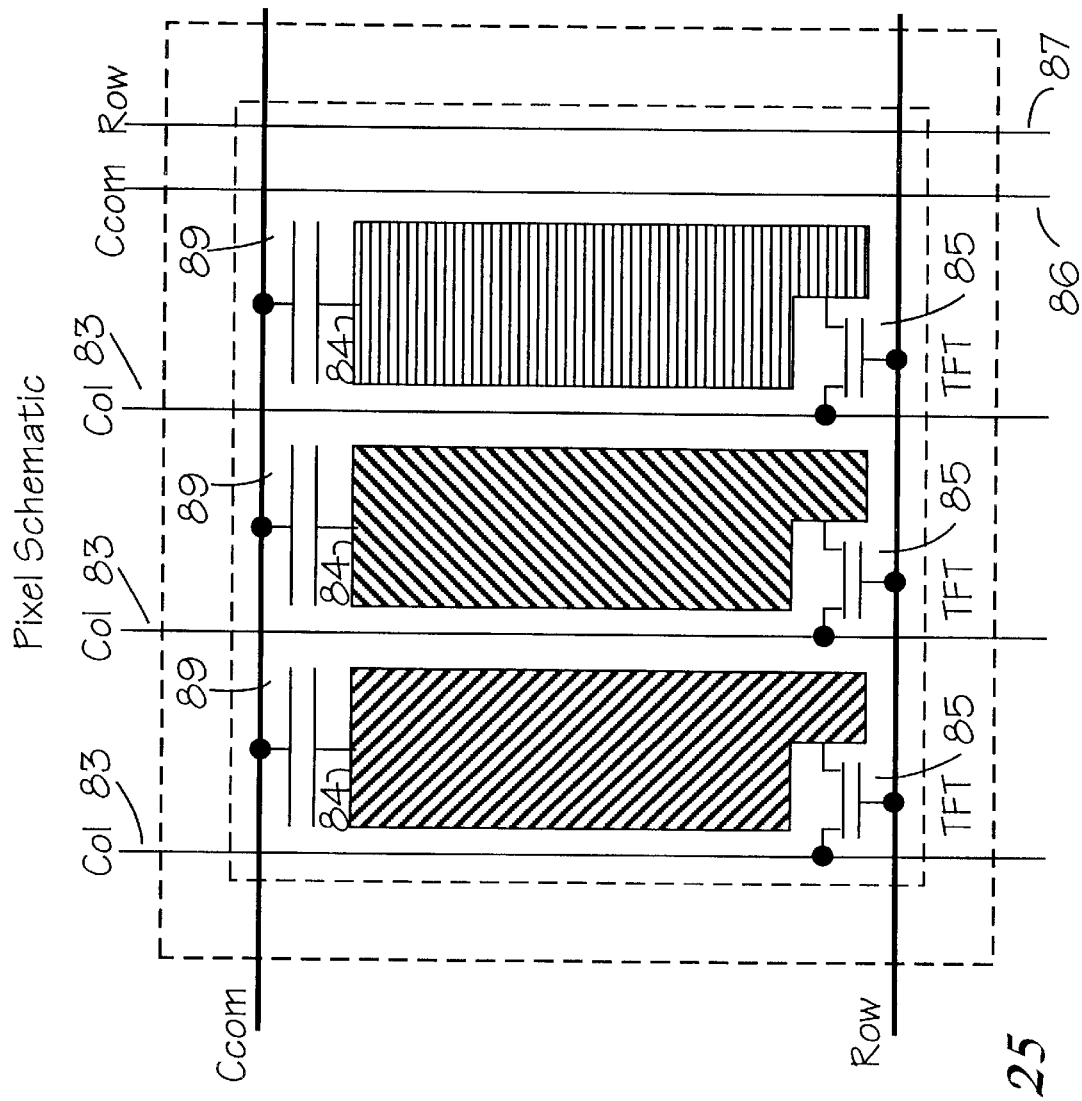
FIG. 25 shows a connection diagram at a pixel element for row and column drivers on a common tile edge.

The flex connection 82 to the backplate 22 may be outside the shadow of the tile 10, as shown in FIG. 25, or folded under the tile 10, so as to minimize the dimension which must be accommodated in the seamless design.

FIG. 25 shows a connection diagram at a pixel element for row and column drivers on a common tile edge. Column driver lines 83 between columns of sub-pixels 84 deliver column driver inputs to TFT transistors 85 to control voltage levels at electrodes of the sub-pixels. $C_{com}$ lines 86 and row driver lines 87 (similar in concept, but differing in location to row driver lines 77 shown in FIG. 23), may be routed between pixels in a direction parallel to column driver lines 83. Row driver lines 87 may be routed on a second wiring plane, not shown, to deliver row driver inputs to TFT transistors 85. Similarly, $C_{com}$ lines 86 may be routed on this second wiring plane to provide connections to capacitors 89.

Figure 26:
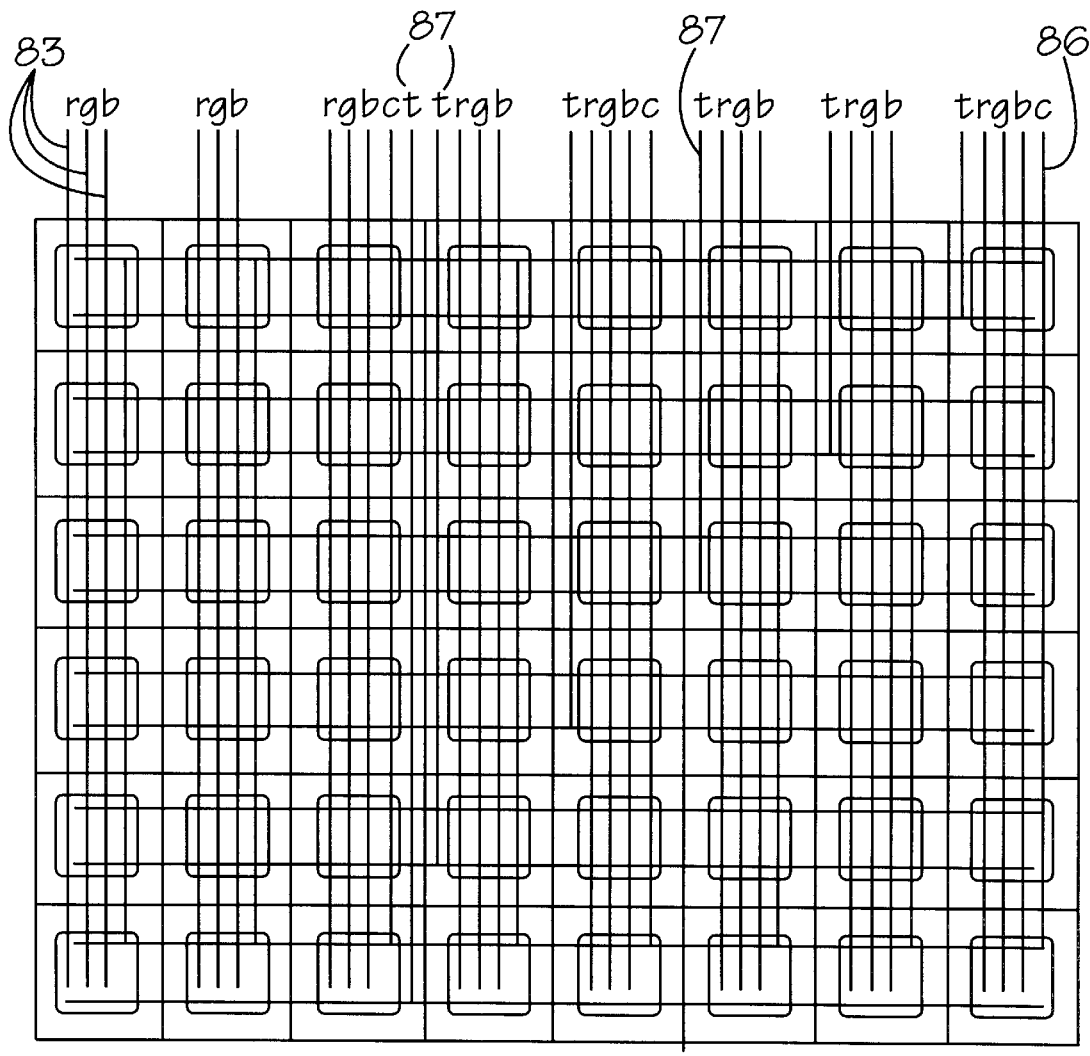
FIG. 26 shows a wiring schematic for a tile for row and column drivers on a common tile edge.

FIG. 26 shows this connection concept for a tiled array of pixels. As can be seen from FIG. 26 multiple row (gate) lines 87 may be routed between pixels to provide row drivers for tile arrays with a larger number of rows than columns.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A substantially flat, panel display (FPD) comprising a mosaic of individual, substantially hermetically-sealed tiles, disposed adjacent one another and having visually imperceptible seams therebetween, said tiles being individually sealed with first sealing means and having drivers operatively connected thereto, at least one of said tiles and said drivers comprises a Known Good Tile, and said substantially flat, panel display being sealed with second sealing means, so as to reduce degradation of individual tiles by moisture diffusion; said display further comprising a cover plate and a backplate, said tiles being affixed to said cover plate and supported by said backplate.

2. The substantially flat, panel display in accordance with claim 1, wherein said first sealing means comprises substantially non-permeable seal material.

3. The substantially flat, panel display in accordance with claim 2, wherein said tiles have edges and said edges are metallized.

4. The substantially flat, panel display in accordance with claim 3, wherein said metallized edges comprise impermeable film adhesively bonded at said edges.

5. The substantially flat, panel display in accordance with claim 3, wherein said substantially non-permeable seal material further comprises solder bridging to achieve substantially hermetic sealing.

6. The substantially flat, panel display in accordance with claim 2, wherein said substantially non-permeable seal material further comprises Solgel-like material to achieve substantially hermetic sealing.

7. The substantially flat, panel display in accordance with claim 2, wherein said tiles comprise plates roughened in areas at said first sealing means.

8. The substantially flat, panel display in accordance with claim 2, wherein said tiles further comprise top and bottom plates, at least one of said plates being coated with polyimide, said first sealing means being disposed therebetween.

9. The substantially flat, panel display in accordance with claim 8, wherein said polyimide coating is selectively removed in areas at said first sealing means.

10. The substantially flat, panel display in accordance with claim 1, further comprising a cover plate, and said tiles being affixed to said cover plate.

11. The substantially flat, panel display in accordance with claim 10, wherein said cover plate comprises an upper surface forming a display screen.

12. The substantially flat, panel display in accordance with claim 11, wherein said tiles are substantially coplanar with said cover plate to maintain optical performance.

13. The substantially flat, panel display in accordance with claim 10, wherein said cover plate comprises glass.

14. The substantially flat, panel display in accordance with claim 1, further comprising a backplate, said tiles being supported by said backplate.

15. The substantially flat, panel display in accordance with claim 14, wherein said backplate comprises glass.

16. A substantially flat, panel display (FPD) comprising a mosaic of individual, substantially hermetically-sealed tiles, disposed adjacent one another and having visually imperceptible seams therebetween, said tiles being individually sealed with first sealing means, said first sealing means comprising a substantially non-permeable seal material, said tiles further comprising top and bottom plates, at least one of said plates being coated with polyimide, said first sealing means being disposed therebetween, said polyimide coating being selectively removed in areas at said first sealing means, and said substantially flat, panel display being sealed with second sealing means, so as to reduce degradation of individual tiles by moisture diffusion.

17. The substantially flat, panel display in accordance with claim 16, further comprising a cover plate and a backplate, said tiles being affixed to said cover plate and supported by said backplate.

18. The substantially flat, panel display in accordance with claim 17, further comprising drivers that are operatively connected to said tiles.

19. The substantially flat, panel display in accordance with claim 18, wherein said drivers are operatively connected to a single edge of at least one of said tiles.

20. The substantially flat, panel display in accordance with claim 18, wherein at least one of said tiles and said drivers comprises a Known Good Tile.

21. The substantially flat, panel display in accordance with claim 20, wherein said backplate comprises interconnections for facilitating electrical communications to and among said tiles.

22. A substantially flat, panel display (FPD) comprising a mosaic of individual, substantially hermetically-sealed tiles, disposed adjacent one another and having visually imperceptible seams therebetween, said tiles being individually sealed with first sealing means and comprising drivers operatively connected thereto, and wherein said drivers are operatively connected to a single edge of at least one of said tiles, said substantially flat, panel display being sealed with second sealing means, so as to reduce degradation of individual tiles by moisture diffusion; said display further comprising a cover plate and a backplate, said tiles being affixed to said cover plate and supported by said backplate.

* * * * *